US012575565B2

(12) United States Patent
Ortmann

(10) Patent No.: US 12,575,565 B2
(45) Date of Patent: Mar. 17, 2026

(54) DISINFECTANT/SANITIZER SOLUTIONS

(71) Applicant: Sterilex, LLC, Hunt Valley, MD (US)

(72) Inventor: Nathan Richard Ortmann, Hunt Valley, MD (US)

(73) Assignee: Sterilex, LLC, Hunt Valley, MD (US)

( * ) Notice: Subject to any disclaimer, the term of this patent is extended or adjusted under 35 U.S.C. 154(b) by 0 days.

(21) Appl. No.: 17/378,105

(22) Filed: Jul. 16, 2021

(65) Prior Publication Data

US 2022/0015359 A1 Jan. 20, 2022

Related U.S. Application Data

(60) Provisional application No. 63/053,039, filed on Jul. 17, 2020.

(51) Int. Cl.

| | |
|---|---|
| *A01N 25/04* | (2006.01) |
| *A01N 25/30* | (2006.01) |
| *A01N 33/02* | (2006.01) |
| *A01N 33/12* | (2006.01) |
| *A01N 35/02* | (2006.01) |

(52) U.S. Cl.
CPC ............. *A01N 33/12* (2013.01); *A01N 25/04* (2013.01); *A01N 25/30* (2013.01); *A01N 35/02* (2013.01)

(58) Field of Classification Search
CPC ................................ A01N 25/04; A01N 33/12
See application file for complete search history.

(56) References Cited

U.S. PATENT DOCUMENTS

| | | | | |
|---|---|---|---|---|
| 3,991,124 | A | * | 11/1976 | Schellenbaum ..... A23K 20/111 424/70.13 |
| 4,486,334 | A | * | 12/1984 | Horiuchi .............. A61K 8/0295 516/77 |
| 5,320,805 | A | | 6/1994 | Kramer et al. |
| 6,117,364 | A | | 9/2000 | Vordenbruggen et al. |
| 6,251,951 | B1 | | 6/2001 | Emerson et al. |
| 6,841,090 | B1 | * | 1/2005 | Serego Allighieri .. A01N 31/02 252/186.1 |
| 7,112,559 | B1 | | 9/2006 | Mayhall et al. |
| 7,216,710 | B2 | | 5/2007 | Welton et al. |
| 8,318,085 | B2 | | 11/2012 | Cassidy et al. |
| 8,778,370 | B2 | | 7/2014 | Kramer et al. |
| 8,784,910 | B2 | | 7/2014 | Lutz et al. |
| 9,095,134 | B2 | | 8/2015 | Eder et al. |
| 9,661,856 | B1 | | 5/2017 | Bright et al. |
| 10,624,826 | B2 | | 4/2020 | Eder et al. |
| 2002/0137631 | A1 | | 9/2002 | Falder et al. |
| 2003/0005484 | A1 | | 1/2003 | Crandall et al. |
| 2004/0102501 | A1 | | 5/2004 | Lutz et al. |
| 2004/0209962 | A1 | | 10/2004 | Crandall |
| 2005/0002964 | A1 | | 1/2005 | Bockmuhl et al. |
| 2007/0258996 | A1 | | 11/2007 | Mookerjee |
| 2008/0194518 | A1 | | 8/2008 | Mookerjee et al. |
| 2008/0221003 | A1 | | 9/2008 | Meine et al. |
| 2008/0227668 | A1 | | 9/2008 | Welton |
| 2010/0148768 | A1 | | 6/2010 | Schwarz et al. |
| 2011/0263665 | A1 | | 10/2011 | Schwarz et al. |
| 2012/0034313 | A1 | | 2/2012 | Wrangham et al. |
| 2012/0071525 | A1 | | 3/2012 | Schwarz et al. |
| 2012/0111743 | A1 | | 5/2012 | Kramer et al. |
| 2012/0121723 | A1 | | 5/2012 | Mookerjee et al. |
| 2012/0225948 | A1 | * | 9/2012 | Heisig .................... A01N 33/12 514/642 |
| 2014/0135297 | A1 | | 5/2014 | Narayanan et al. |
| 2014/0171512 | A1 | | 6/2014 | Kloeppel |
| 2015/0250224 | A1 | * | 9/2015 | Castro .................... A01N 59/00 424/665 |
| 2016/0030618 | A1 | * | 2/2016 | Samani ................. A01N 59/00 424/76.1 |
| 2016/0143275 | A1 | | 5/2016 | Lan et al. |
| 2016/0177170 | A1 | | 6/2016 | Janak et al. |
| 2017/0015945 | A1 | | 1/2017 | Larson |
| 2017/0119917 | A1 | | 5/2017 | Frankenbach et al. |
| 2018/0027855 | A1 | | 2/2018 | Popplewell et al. |
| 2018/0087009 | A1 | | 3/2018 | Man et al. |

FOREIGN PATENT DOCUMENTS

| | | |
|---|---|---|
| AU | 2013223759 B2 | 8/2013 |
| BR | 112013006096 B1 | 7/2018 |
| CN | 1476761 A | 2/2004 |
| CN | 105746562 A | 7/2016 |
| DE | 60129427 | 3/2008 |

(Continued)

OTHER PUBLICATIONS

Machine translation, CN 1476761 (Year: 2004).*
"Emulsifier OP-10", www.chinafluid.com/product_detail_en/id/11. html (Year: 2014).*
Olszewska et al., "The Effects of Eugenol, Trans-Cinnamaldehyde, Citronellol, and Terpineol on *Escherichia coli* Biofilm Control as Assessed by Culture-Dependent and -Independent Methods", Molecules, 25, 2641 (Year: 2020).*
FDA—Generally Recognized as Safe (GRAS); https://fda.gov/food/food-ingredients-packaging/generally-recognized-safe-gras, accessed Jun. 29, 2022.*
"Biguanide", Merriam-Webster Medical dictionary, https://www. merriam-webster.com/medical/biguanide, accessed Jun. 12, 2023 ( Year: 2023).*
Stegniy et al., "Virucidal Properties of Innovative Disinfectant to Avian Influenza Virus and Newcastle Disease Virus", Journal for Veterinary Medicine, Biotechnology and Biosafety, vol. 5, Issue 3, pp. 27-33 (Year: 2019).*

(Continued)

*Primary Examiner* — Kyle A Purdy
(74) *Attorney, Agent, or Firm* — Frost Brown Todd LLP; Nicole M. Tepe

(57) ABSTRACT

Disinfectant/sanitizer solutions contain aldehyde, surfactant, a quaternary ammonium compound, a main solvent and a co-solvent. Clear disinfectant/sanitizer solutions are made by adding the components of the solutions in a certain order and mixing them together. Concentrated disinfectant/sanitizer solutions can be diluted prior to being applied to a hard surface. Disinfectant/Sanitizer solutions are in the form of a liquid or spray. Liquid disinfectant/sanitizer solutions may be applied to a hard surface using a wipe impregnated or wetted with the solutions.

5 Claims, 9 Drawing Sheets

(56)  References Cited

FOREIGN PATENT DOCUMENTS

| EP | 0046375 A2 | 2/1982 | |
| EP | 3747965 A1 * | 12/2020 | ............... C09G 1/02 |
| EP | 3598897 | 1/2021 | |
| JP | 5487103 B2 | 5/2014 | |
| WO | WO 2008/041008 | 4/2008 | |
| WO | WO 2013/061082 | 5/2013 | |
| WO | WO 2013/098547 | 7/2013 | |
| WO | WO-2013192463 A1 * | 12/2013 | .............. A61P 29/00 |
| WO | WO 2016/156869 | 10/2016 | |
| WO | WO 2017/222965 A1 | 12/2017 | |
| WO | WO 2018/033718 | 2/2018 | |

OTHER PUBLICATIONS

Malheiro et al., "Biocide Potentiation Using Cinnamic Phytochemicals and Derivatives", Molecules, 2019, 24, 3918, 15 pages (Year: 2019).*

De Oliveira et al., "Cinnamon essential oil and cinnamaldehyde in the control of bacterial biofilms formed on stainless steel surfaces" , Eur Food Res Technol, 2012, 234, pp. 821-832 (Year: 2012).*

"What is micellar water and how does it work?", (Feb. 11, 2024), accessed Aug. 15, 2024 from https://phys.org/news/2024-02-micellar.html (Year: 2024).*

Park et al., Food Sci Biotechnol, 2018, 27, 1, 47-55.*

Chemsoft Eh&s: "Neogen TM Safety Data Sheet according to 29 CFR 1910.1200 and GHS, Synergize TM," in: "Neogen TM Safety Data Sheet according to 29 CFR 1910.1200 and GHS, Synergize TM," Jun. 22, 2020 (Jun. 22, 2020), XP055838350, pp. 1, 3 and 6.

International Search Report and Written Opinion dated Oct. 8, 2021, for International Application No. PCT/US2021/042005, 20 pages.

Human translation of paragraph 27 only for Chinese Patent Application No. CN1476761A. translated on Feb. 26, 2022.

* cited by examiner

| | Chemical Name | Trade Name | A | B | C | D | E | F | G | H | I | J | K | L | M | N |
|---|---|---|---|---|---|---|---|---|---|---|---|---|---|---|---|---|
| QAC | | | | | | | | | | | | | | | | |
| | QAC: alkyl dimethyl benzyl ammonium chloride; octyl decyl dimethyl ammonium chloride; dioctyl dimethyl ammonium chloride; and dodecyl dimethyl ammonium chloride | Bardac 208M | 17 | 13 | 16 | 16 | 16 | 12 | 12 | 12 | 13 | 13 | 16 | 16 | 16 | 15 |
| | QAC: benzyl-C12-18alkyldimethyl, chlorides OR QAC: C12-14-alkyl(ethylphenyl)methyldimethyl, chlorides | Barquat 4520Z or Barquat 4280Z | | | | | | | | | | | | | | |
| | alkyl dimethyl benzyl ammonium saccharainate | | | | | | | | | | | | | | | |
| ALDEHYDE | | | | | | | | | | | | | | | | |
| | 2-Propenal, 3-phenyl-, (2E)- | Cinnamaldehyde | 4.9 | 3.9 | 4.9 | 4.9 | 4.9 | 9 | 9 | 4.5 | 4.5 | 4 | 5 | 5 | 5 | 10 |
| | Benzaldehyde | Benzaldehyde | | | | | | | | | | | | | | |
| | 3,7-dimethyl-2,6-octadienal | citral | | | | | | | | | | | | | | |
| SURFACTANT | | | | | | | | | | | | | | | | |
| | myristyl amine oxide | Barlox 14 | | | | | | 1.5 | 1.5 | 1.5 | | | | | | |
| | 2-ethylhexanol ethoxylate propoxylate | Ecosurf EH-9 | | 4.5 | 4.5 | 4.5 | 4.5 | | | | 4.5 | 5 | 5 | 5 | 5 | 10 |
| | Alcohol ethoxylate, C9-11 | Biosoft N91-8 | | | | | | 10 | 10 | 10 | | | | | | |
| | cocoamine oxide | Barlox 12 | | | | | | | | | | | | | | |
| | Alcohol ethoxylate, C12-15 | Neodol 25-7 | | | | | | | | | | | | | | |
| | Lauryl amine oxide | Lauryl Amine Oxide | | | | | | | | | | | | | | 5 |
| | Polysorbate 80 | Tween 80 | | | | | | | | | | | | | | |
| CO-SOLVENT | | | | | | | | | | | | | | | | |
| | 2-(2-butoxyethoxy)ethanol or diethylene glycol n-butyl ether | Butyl Carbitol | | 10 | | 5 | 5 | | | | | 8 | 10 | | | |
| | Polyethylene Glycol | PEG 400 | | | 5 | | | | | | | | | 5 | 5 | 5 |
| | Propylene Glycol | Propylene Glycol | | | | | | | | | | | | | | |
| | 2-propanol | Isopropyl Alcohol | | | | | | | | | | | | | | |
| | Glycerin or Glycerol | Glycerine | | | | | | | | | | | | | | |
| SOLVENT | | | | | | | | | | | | | | | | |
| | | Water | 78 | 69 | 69.6 | 69.6 | 69.1 | 67 | 67 | 71 | 72 | 68 | 74 | 69 | 69 | 55 |
| CHELANT | | | | | | | | | | | | | | | | |
| | Ethylenediaminetetraacetic acid, tetrasodium salt | Dissolvene 100-S | | | | | | | | | | | | | | |
| | 1-Hydroxyethylidene-1,1-diphosphonic acid | Dequest 2010 | | | | | | | | | | | | | | |
| CORROSION INHIBITOR | | | | | | | | | | | | | | | | |
| | 2-Phosphono-1,2,4-Butanetricarboxylic Acid (Bayhibit AM) | Bayhibit AM | | | | | | 1 | | 1 | 1 | | | | | |
| | Phosphate Ester | Cola®Fax 3383 | | | | | | | | 1 | | | | | | |
| | 2-Phosphono-1,2,4-Butanetricarboxylic Acid (Bayhibit AM) | Bayhibit S | | | | | | 0.5 | | | | | | | | |
| STABILITY ENHANCER | | | | | | | | | | | | | | | | |
| | Tocopheryl Polyethylene Glycol Succinate | Vitamin E | | | | | | | | | | | | | 0.1 | |
| | Ascorbic Acid | Vitamin C | | | | | | | | | | | | | | |
| | Sodium Citrate | | | | | | | | | | | | | | | |
| pH Adjuster | | | | | | | | | | | | | | | | |
| | Glycolic Acid | | | | | | | | | | | | | | | |
| | Glycolic Acid, Sodium Salt | | | | | | | | | | | | | | | |
| TOTAL | | | 100 | 100 | 100 | 100 | 100 | 100 | 100 | 100 | 100 | 100 | 100 | 100 | 100 | 100 |

FIG. 1A

| O | P | Q | R | S | T | U | V | W | X | Y | Z | AA | BB | CC | DD | EE | FF | GG | HH | II | JJ | KK | LL | MM | Comp. Ex. 1 | Comp. Ex. 2 |
|---|---|---|---|---|---|---|---|---|---|---|---|----|----|----|----|----|----|----|----|----|----|----|----|----|----|----|
| 15 | 15 |  | 15 | 15 | 15 |  |  | 15 | 15 | 15 | 9.6 | 16 |  |  | 16 | 16 | 0.1 | 0.1 |  | 1 | 5 | 30 |  | 16 | 17 | 16 |
|  |  |  |  |  |  | 30 | 30 |  |  |  |  |  |  | 8 |  |  |  |  | 58 |  |  |  |  |  |  |  |
|  |  |  |  |  |  |  |  |  |  |  |  |  | 16 | 8 |  |  |  |  |  |  |  |  | 5 |  |  |  |
|  | 20 | 20 | 20 | 20 | 10 | 10 | 10 | 10 | 20 | 10 | 7.7 | 13 |  |  | 5 | 5 | 0.035 | 0.035 | 0.1 |  | 1 |  | 5 | 5 |  | 4.9 |
|  |  |  |  |  |  |  |  |  |  |  |  |  |  | 5 |  |  |  |  |  | 25 |  | 5 |  |  |  |  |
|  |  |  |  |  |  |  |  |  |  |  |  |  | 5 |  |  |  |  |  |  |  |  | 3 |  |  |  |  |
|  |  |  |  |  | 5 | 5 | 5 | 5 | 5 | 5 | 5 | 5 |  |  |  |  |  |  |  |  | 1 |  |  |  |  |  |
| 10 | 10 | 10 | 10 | 10 |  |  |  |  |  |  |  |  |  |  | 5 | 5 | 0.035 | 0.035 | 10 |  |  |  |  | 5 |  | 4.5 |
|  |  |  |  |  | 10 | 10 | 10 | 10 | 30 | 10 | 10 | 10 |  |  |  |  |  |  |  |  |  | 30 |  |  |  |  |
|  |  | 5 | 5 |  |  |  |  |  |  |  |  |  |  |  |  |  |  |  |  |  |  |  |  |  |  |  |
|  |  |  |  |  |  |  |  |  |  |  |  |  | 5 |  |  |  |  |  |  |  |  | 6 |  |  |  |  |
| 5 | 5 | 5 |  |  |  |  |  |  |  |  |  |  | 4 |  |  |  |  |  |  |  |  |  |  |  |  |  |
|  |  |  |  |  |  |  |  |  |  |  |  |  | 5 |  |  |  |  |  |  |  |  | 10 |  |  |  |  |
|  |  |  |  |  |  |  |  |  |  |  |  |  |  |  | 5 | 5 | 0.035 |  | 30 |  |  | 5 |  |  |  |  |
| 5 | 5 | 5 | 5 | 5 |  |  |  |  |  |  |  |  | 5 |  |  |  |  |  |  |  |  |  | 10 |  |  |  |
|  |  |  |  |  |  |  |  |  |  |  |  |  | 5 |  |  |  |  |  |  |  |  |  |  |  |  |  |
|  |  |  |  |  |  |  |  |  |  |  |  |  |  |  |  |  |  |  | 10 |  | 4 |  | 40 |  |  |  |
|  |  |  |  |  |  |  |  |  |  |  |  |  | 5 |  |  |  |  |  |  | 0.5 |  |  |  |  |  |  |
| 85 | 45 | 60 | 45 | 35 | 50 | 44 | 26 | 50 | 40 | 60 | 80 | 56 | 60 | 56 | 68.3 | 68.4 | 99.8 | 89.73 | 9.9 | 44.5 | 90 | 30 | 50 | 56.5 | 83 | 74.6 |
|  |  |  |  |  |  |  |  |  |  |  |  |  | 3 |  |  |  |  |  |  |  |  |  |  |  |  |  |
|  |  |  | 10 |  |  |  |  |  |  |  |  |  | 1 |  |  |  |  |  |  | 0.01 |  |  |  |  |  |  |
|  |  |  |  |  |  |  |  |  |  |  |  |  | 1 |  |  |  |  |  |  |  |  |  |  |  |  |  |
|  |  |  |  |  | 1 | 1 | 1 | 1 | 1 |  |  |  |  |  | 0.5 | 0.5 |  |  |  |  |  | 5 |  |  |  |  |
|  |  |  |  |  |  |  |  |  |  |  |  |  |  | 0.1 |  |  |  |  |  |  |  |  |  |  |  |  |
|  |  |  |  |  |  |  |  |  |  |  |  |  |  | 0.1 |  |  |  |  |  |  |  |  |  |  |  |  |
|  |  |  |  |  |  |  |  |  |  |  |  |  |  |  | 0.1 | 0.1 |  |  |  |  |  | 5 |  |  |  |  |
|  |  |  |  |  |  |  |  |  |  |  |  |  |  |  |  |  |  |  |  |  |  |  |  | 5 |  |  |
|  |  |  |  |  |  |  |  |  |  |  |  |  |  |  |  |  |  |  |  |  |  |  |  | 2.5 |  |  |
| 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 |

FIG. 1B

Acrylic

Viton

EPDM

DISINFECTANT/SANITIZER SOLUTIONS

CROSS-REFERENCE TO RELATED APPLICATION

This application claims priority to and the benefit of U.S. Patent Application No. 63/053,039, entitled "DISINFECTANT/SANITIZER SOLUTIONS," which was filed on Jul. 17, 2020. The contents of the aforementioned application are incorporated herein in their entirety for all purposes.

BACKGROUND

Surface treatment compositions for use on non-food contact and food contact surfaces are known. Effective surface treatment compositions that have the capacity to disinfect and/or sanitize surfaces in addition, or in alternative to, being used to clean surfaces, are especially useful in environments that are vulnerable to microbial contamination. Such environments may include, but are not limited to, farms (e.g., poultry farms, swine farms, hatcheries, dairies), animal health care environments (e.g., veterinarian offices), human health care environments (e.g., doctor's offices, hospitals) and in the food and beverage industry (e.g., food processing facilities).

Synergize® is advertised by Neogen as a hospital grade, multi-purpose disinfectant-cleaner with a quaternary ammonium/glutaraldehyde combination active chemistry. Neogen's website indicates that Synergize® may be applied to a surface to be treated by using a mechanical sprayer, by fogging and by soaking. The Safety Data Sheet published on Nov. 19, 2019, indicates that Synergize® may cause asthma symptoms or breathing difficulties if inhaled and may cause cancer. The EPA Master Label for Synergize® published on Feb. 6, 2017, indicates that safety goggles or a face shield, a dust/mist/filtering respirator and chemical resistant gloves should be worn when using or handling Synergize®.

U.S. Pat. Pub. No. 2014/0171512 ("U.S. '512"), which is entitled, "Food Contact Disinfecting/Sanitizing Formulation and Wipe," discloses ready to use sanitizing/disinfecting compositions containing a quaternary ammonium compound, e.g., a carboquat, and a polybiguanide, for example, polyhexamethylene biguanide ("PHMB"). U.S. '512 discloses quaternary ammonium compounds and polybiguanide respectively being present in the ready to use compositions at up to about 400 ppm and up to about 550 ppm. U.S. '512 indicates that a wipe substrate may be saturated with the disclosed compositions.

WO Pub. No. 2018033718 A1 ("WO '718"), which is entitled, "Anti-Microbial Composition," discloses anti-microbial compositions and formulations including the anti-microbial compositions, that are particularly of use on skin, but that can also be used on hard surfaces. According to WO '718, anti-microbial compositions may comprise an anti-microbial quaternary ammonium compound, chlorhexidine or a chlorhexidine salt and polar solvent, such as glycol ether.

U.S. Pat. Pub. No. 2002/0137631 ("U.S. '631"), which is entitled, "Anti-microbial Composition," discloses an anti-microbial composition comprising (i) an anti-microbial agent, (ii) a polar solvent and (iii) a surface orienting species, which concentrates the anti-microbial agent at a surface of the composition to prevent the formation of microbial colonies on or at the surface. According to U.S. '631, a useful antimicrobial agent may be selected from amphoteric compounds, iodophores, phenolic compounds, quaternary ammonium compounds, hypochlorites and nitrogen-based heterocyclic compounds.

U.S. Pat. No. 6,117,364 ("U.S. '364), which is entitled, "Acid Corrosion Inhibitor," discloses an aqueous acid corrosion inhibitor composition that is provided for petroleum wells and water wells subjected to stimulation with acid solutions. U.S. '364 indicates that the acid corrosion inhibitor, which combines cinnamaldehyde and an organo-sulfur compound, provides a reduced rate of corrosion and fewer instances of pitting than inhibitors which include cinnamaldehyde alone. U.S. '364 indicates that the enhanced performance by the acid corrosion inhibitor is provided by a synergistic action between the cinnamaldehyde and an organo-sulfur compound. Compositions according to U.S. '364 may comprise quaternary salts in addition to cinnamaldehyde and an organosulfur compound. According to U.S. '364, quaternary salts of use include alkylpyridine quaternary salt, chloromethyl napthalene quaternary salt, alkyl pyridine-N-methyl chloride quaternary salt, alkyl pyridine-N-benzyl chloride quaternary salt, quinoline-N-methyl chloride quaternary salt, quinoline-N-benzyl chloride quaternary salt, quinoline-N-(chloro-benzyl chloride) quaternary salt, isoquinoline quaternary salt, benzoquinoline quaternary salt, chloromethyl napthalene quaternary salt.

A need remains for a disinfectant/sanitizer composition that may be safely utilized by an end user without the need for special protective equipment, including but not limited to a face shield or respirator. It would be desirable if such a disinfectant/sanitizer composition is not formulated with a polybiguanide, for example polyhexamethylene biguanide (i.e., "PHMB"), which is relatively expensive to use, has been classified in Europe as a carcinogen, and the use of which may be limited or banned in other countries. It would also be desirable if such a disinfectant/sanitizer composition does not leave a hard-to-remove sticky residue on a hard surface like compositions comprising ammonium chloride blended with glutaraldehyde do, and that can also present a health risk when sprayed or foamed. Such a disinfectant/sanitizer composition should have broad utility, including, but not limited to, utility on farms (e.g., poultry farms, swine farms, hatcheries), in dairies and in animal and human health care environments (e.g., veterinary clinics, doctors' offices, hospitals), as well as in the food and beverage industry (e.g., in food and beverage processing facilities) and be formulated for use on any buildings and equipment in these facilities including, but not limited to: hog barns, hatcheries, sow units, animal stalls, cages, waterers, feeders, farm equipment, hauling vehicles and equipment, livestock pens, kennels, warehouses, egg rooms, processing facilities, farrowing barns, nurseries, blocks, creep areas and chutes.

While a variety of compositions and methods for disinfecting/sanitizing surfaces have been made and used, it is believed that no one prior to the inventors has made or used an invention as described herein.

BRIEF SUMMARY

In general, the present disclosure is directed to disinfectant/sanitizer solutions, methods of disinfecting/sanitizing hard surfaces and product forms including, but not limited to, wipes.

Exemplary disinfectant/sanitizer solutions may comprise the following: from about 1% to about 50% of a quaternary ammonium compound; from about 0.1% to about 25% of an aldehyde; from about 0.1% to about 30% of a surfactant; from about 30% to about 90% of a Main Solvent as described herein; and from about 0.5% to about 40%, from about 1% to about 30% or from about 2% to about 20% of a Co-Solvent as described herein. Such exemplary disinfectant/sanitizer solutions may be diluted prior to use.

Exemplary ready to use disinfectant/sanitizer solutions may comprise the following: from about 0.02% to about 2% of a quaternary ammonium compound; from about 0.001% to about 2% of an aldehyde; from about 0.001% to about 10% of a surfactant; from about 40% to about to about 99.999% of a Main Solvent as described herein; and from about 0.001% to about 40% of a Co-Solvent as described herein.

Various methods of making and using exemplary disinfectant/sanitizer solutions, are also disclosed. Exemplary methods of making exemplary disinfectant/sanitizer solutions may comprise adding to a mixing vessel in the following order: a Main Solvent, a Co-Solvent, an aldehyde and a surfactant, and stirring them together followed by adding a quaternary ammonium compound to the mixing vessel and stirring until a clear disinfectant/sanitizer solution is generated in the mixing vessel. Exemplary methods of using exemplary disinfectant/sanitizer solutions may comprise applying them to a hard surface and leaving them on the hard surface for a certain period of time.

BRIEF DESCRIPTION OF THE DRAWINGS

Those of skill in the art will understand that the drawings, described below, are for illustrative purposes only. The drawings are not intended to limit the scope of the present teachings in any way.

FIGS. 1A and 1B show a table containing exemplary disinfectant/sanitizer solutions and comparative solutions.

DETAILED DESCRIPTION

Figure 2A:
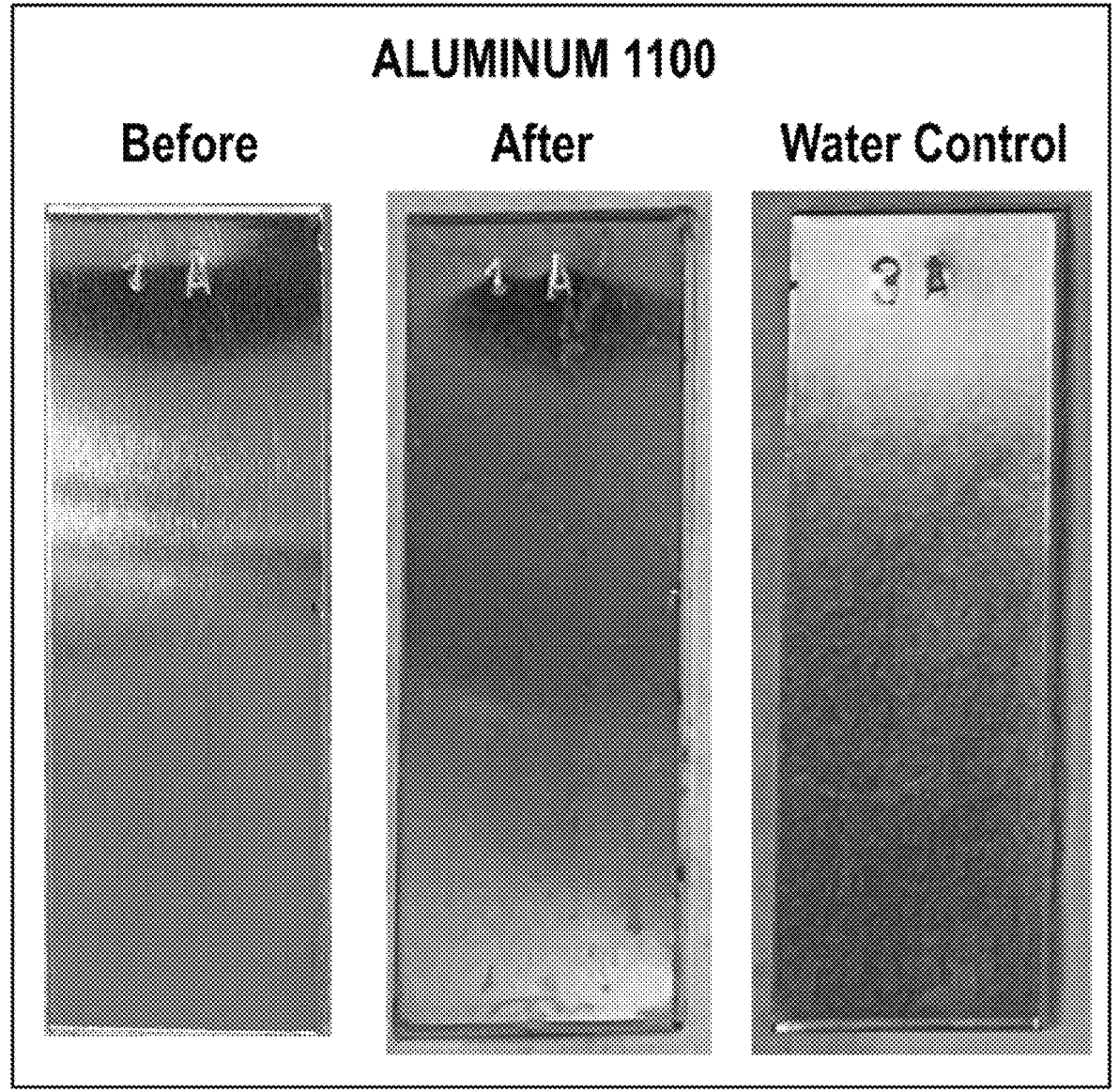
FIGS. 2A through 2D show results of material compatibility testing of various materials with a first exemplary composition.

The following description of certain examples of the invention should not be used to limit the scope of the present invention. Other examples, features, aspects, embodiments and advantages of the invention will become apparent to those skilled in the art from the following description, which is, by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

All percentages, parts and ratios as used herein, are by weight of the total composition, unless otherwise specified. All such weights, as they pertain to listed ingredients, are based on the active level of the ingredients and therefore, do not include solvents or by-products that may be included in commercially available materials, unless otherwise specified.

All references, including patent applications, patent publications and non-patent literature, that are referred to in the present specification are incorporated by reference herein, unless it is expressly indicated that they are not incorporated by reference herein.

Numerical ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9 and so forth.

Every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made. The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "20 mm" is intended to mean "about 20 mm."

"About" or "approximately" as used herein, means within an acceptable error range for the particular value as determined by one of ordinary skill in the art, which will depend in part on how the value is measured or determined, e.g., the limitations of the measurement system. For example, "about" can mean within 1, or more than 1 standard deviation, per the practice in the art. Alternatively, "about" can mean a range of up to 25%, up to 20%, or up to 10%, or up to 5%, or up to 1% of a given value. Where particular values are described in the application and claims, unless otherwise stated the term "about" meaning within an acceptable error range for the particular value should be assumed.

"Clear" or "clear to the naked eye" as used herein, means appearing clear to a human having 20/20 vision, without the use of any special imaging equipment.

"Comprising" as used herein, means that the various components, ingredients, or steps, can be conjointly employed in practicing the present invention. Accordingly, the term "comprising" encompasses the more restrictive terms "consisting essentially of" and "consisting of."

"Disinfectant" as used herein, refers to a substance or a mixture of substances (including solutions) that destroy or irreversibly inactivate bacteria, fungi and viruses, but not necessarily bacterial spores, in an inanimate environment or on a surface (e.g., in or on a substrate).

"Micellar solution" as used herein, means a solution comprising micelles.

"Naturally-derived" as used herein, means an unprocessed chemical that is found in nature, such as chemicals from plants, micro-organisms, animals, the earth and/or the sea, or a chemical that is found in nature and extracted using a process that does not change its chemical composition.

"Sanitizer" as used herein, means a substance or a mixture of substances (including solutions) that reduce a bacterial population in an inanimate environment (e.g., a substrate) by significant numbers, (e.g., a 3 log 10 reduction) or more, but that does not destroy or eliminate all bacteria.

"Co-solvent" as used herein, means a second solvent present in a disinfectant/sanitizer solution in addition to a "main solvent" that is present therein. As used herein, a "co-solvent" is present in exemplary disinfectant/sanitizer solutions in a lower amount (e.g., weight percentage) than a "main solvent" that is also present in the exemplary disinfectant/sanitizer solutions.

"Substantially free of" as used herein, means no effective amount of a specified component or specified class of components, or from about 1 wt. % or less, from about 0.1 wt. % or less, or even from about 0.01 wt. % or less, or 0% (i.e., completely free) of the particular component or class of components as specified herein.

The inventors have surprisingly found that disinfectant/sanitizer solutions comprising a blend of a quaternary ammonium compound with certain aldehyde(s) may provide a superior kill against common organisms found in hatcheries, especially *Aspergillus fumigatus* and *Salmonella enterica*, without requiring the use of glutaraldehyde and/or PHMB. Moreover, it has surprisingly found that disinfectant/sanitizer solutions comprising a blend of quaternary ammonium compounds with the aldehyde(s) may also be characterized by corrosion inhibition properties, such that the solutions are compatible with metallic surfaces including, but not limited to, aluminum and chrome. Moreover, it has surprisingly been found that useful blends of a quaternary ammonium compound with the aldehyde(s) may provide for disinfectant/sanitizer solutions that may be used without requiring face shields or respirators when in use. Moreover, unlike glutaraldehyde-containing compositions, it has surprisingly been found that disinfectant/sanitizer solutions comprising a blend of quaternary ammonium compound with the aldehyde(s) may not leave a sticky, hard-to-remove residue on a hard surface. Moreover, it has been found that disinfectant/sanitizer solutions comprising a blend of a quaternary ammonium compound with the aldehyde(s) may provide a scent that is pleasing to the end user. Moreover, disinfectant/sanitizer solutions comprising the aldehyde(s), specifically cinnamaldehyde, may further comprise insecticidal and/or insect repellency characteristics.

Disinfectant/sanitizer solutions in accordance with the present disclosure provide some or all of the foregoing advantages, while being suitable for use in a wide variety of applications, including, but not limited to, on farms (e.g., poultry farms, swine farms, hatcheries), in dairies and in animal and human health care environments (e.g., veterinary clinics, doctors' offices, hospitals), as well as in the food and beverage industry (e.g., in food and beverage processing facilities, bakeries, restaurants, delis, locker rooms, break rooms, etc.), and being formulated for use in any buildings and on any equipment in these facilities including, but not limited to: hog barns, hatcheries, sow units, animal stalls, cages, waterers, waters, feeders, farm equipment, hauling vehicles and equipment, livestock pens, kennels, warehouses, egg rooms, processing facilities, farrowing barns, nurseries, blocks, creep areas and chutes.

The disinfectant/sanitizer solutions of the present disclosure may be provided as a concentrated solution (i.e., as a "concentrate") or as a ready-to-use (i.e., an "RTU") solution, either of which may be applied to a substrate to be treated, e.g., a hard surface, using known application means. Some exemplary disinfectant/sanitizer solutions may be applied to a nonwoven substrate to make a wipe, wherein the wipe is used to apply the disinfectant/sanitizer solutions to a surface to be treated with the solutions. An advantage of using a wipe is that it may be disposed of after use, such that it will not be reused to apply the solution to more than one surface.

It should be noted that disinfectant/sanitizer solutions as described herein may act as a disinfectant and a sanitizer by respectively destroying or irreversibly inactivating certain bacteria, fungi and/or viruses present on a substrate, and by reducing the population of certain other bacteria that are present on the same substrate.

Disinfectant/Sanitizer Solutions

In accordance with the present disclosure, both concentrated and RTU solutions are solutions comprising: A. Quaternary Ammonium Compound; B. Aldehyde; C. Surfactant; and D. Solvent (Main and Co-Solvents). Some exemplary disinfectant/sanitizer solutions further comprise: E. Corrosion Inhibitor; F. Stability Agent; and G. Chelant. Such concentrated and RTU solutions may be clear.

Depending upon the application, the current disinfectant/sanitizer solutions may be applied to a hard surface in the form of a concentrate or in the form of an RTU solution. Concentrated or RTU solutions may be provided to the end user. Alternatively, RTU solutions may be prepared by an end user by diluting a concentrate in an amount such that a resulting concentration of actives in the solutions are appropriate for a particular use. It is to be noted that an RTU solution may be made from a concentrated disinfectant/sanitizer solution by diluting the concentrated disinfectant/sanitizer solution with any suitable amount of water, alcohol and/or other compounds or compositions to arrive at a final concentration that suits its intended use. For example, an exemplary RTU solution for use in disinfecting a surface may be prepared by diluting about 1 ounce of a concentrated disinfectant/sanitizer solution with about 128 ounces (1 gallon) of water. In a further example, an exemplary RTU solution for use in sanitizing a surface may be prepared by diluting about 1 ounce of the concentrated disinfectant/sanitizer solution with about 256 ounces of water. Alternatively, an exemplary RTU solution may be made by mixing together different components to arrive at a disinfectant/sanitizer solution containing components at the desired weight percentages, thus skipping the two steps of first forming a concentrated disinfectant/sanitizer solution and then diluting the concentrated disinfectant/sanitizer solution to produce an RTU solution.

A. Quaternary Ammonium Compound

Exemplary quaternary ammonium compounds ("QAC") of use in the present disinfectant/sanitizer solutions have the following general formula:

$$R_1R_2R_3R_4N+X- \tag{I}$$

wherein, $R_1$, $R_2$, $R_3$ and $R_4$ represent independently of each other, alkyl groups, aliphatic groups, aromatic groups, alkoxy groups, polyoxyalkylene groups, alkylamido groups, hydroxyalkyl groups, aryl groups, and $H^+$ ions, each with from 1 to 22 carbon atoms, with the proviso that at least one of the groups $R_1$, $R_2$, $R_3$ and $R_4$ has at least eight carbon atoms and wherein X–represents an anion, for example, a halogen, acetate, phosphate, nitrate or alkyl sulfate, a chloride or a carbonate. The aliphatic groups can also contain cross-linking or other groups, for example additional amino groups, in addition to the carbon and hydrogen atoms.

Depending on the nature of the R groups, the anion and the number of quaternary nitrogen atoms present, the anti-microbial QAC of use may be selected from the following general classes of QAC: mono alkyl trimethyl ammonium compounds; mono alkyl dimethyl benzyl ammonium salts; dialkyl dimethyl ammonium salts; heteroaromatic ammonium salts; polysubstituted quaternary ammonium salts; bisquaternary ammonium salts; polymeric ammonium salts; and combinations thereof. Many of these quaternary ammonium compounds are available from Lonza America, Inc., having offices in Allendale, N.J.

Exemplary mono alkyl trimethyl ammonium salts of use may be selected from: cetyl trimethyl ammonium bromide (CTAB); alkyl trimethyl ammonium chloride; alkyl aryl trimethyl ammonium chloride; cetyl dimethyl ethyl ammonium bromide; and combinations thereof.

Exemplary mono alkyl dimethyl benzyl ammonium salts of use may be selected from: alkyl dimethyl benzyl ammonium chlorides; dodecyl dimethyl 3,4 dichlorobenzyl ammonium chloride; mixtures of alkyl dimethyl benzyl and alkyl dimethyl substituted benzyl(ethyl benzyl) ammonium chlorides; and combinations thereof.

Exemplary dialkyl dimethyl ammonium salts of use may be selected from: didecyl dimethyl ammonium halides; octyl decyl dimethyl ammonium chlorides; N,N-Dialkyl-N,N-dimethylammonium carbonate; N,N-Dialkyl-N,N-dimethyl-ammonium bicarbonate; and combinations thereof.

Exemplary heteroaromatic ammonium salts of use may be selected from: cetylpyridinium halide (CPC); 1-[3-chloro-allyl]-3,5,7-triaza-1-azoniaadamantane; alkyl-isoquinolini-umm bromide; alkyldimethylnaphthylmethyl ammonium chloride; and combinations thereof.

Exemplary polysubstituted quaternary ammonium compounds of use may be selected from: alkyl dimethyl benzyl ammonium saccharinate; alkyl dimethylethylbenzyl ammonium cyclohexylsulfamate; and combinations thereof.

Exemplary bis-quaternary ammonium salts of use may be selected from: 1,10-bis (2-methyl-4-aminoquinolinium chloride)-decane; b1,6-Bis [1-methyl-3-(2,2,6-trmethyl cyclohexyl)-propyldimethyl ammonium chloride] hexane; and combinations thereof.

In some exemplary disinfectant/sanitizer solutions, suitable QAC may be selected from: alkyl dimethyl benzyl ammonium chlorides; alkyl dimethyl ethyl benzyl ammonium chlorides; dialkyl dimethyl quaternary compounds; and combinations thereof.

Alkyl dimethyl benzyl ammonium chlorides of use may be selected from alkyl dimethyl benzyl ammonium chlorides, wherein: the alkyl group is a mixture of about 50% C14, 40% C12 and 10% C16; wherein the alkyl dimethyl benzyl ammonium chloride has an alkyl group which is a mixture of about 5% C12, 60% C14, 30% C16 and 5% C18; and combinations thereof.

Alkyl dimethyl ethyl benzyl ammonium chlorides of use may be selected from alkyl dimethyl ethyl benzyl ammonium chlorides wherein: the distribution of alkyl groups are: about 50% C12, about 30% C14, about 17% C16 and about 3% C18; wherein the alkyl group has the distribution of about 68% C12 and about 32% C14; and combinations thereof.

Dialkyl dimethyl ammonium chlorides of use may be selected from: didecyl dimethyl ammonium chlorides; dioctyl dimethyl ammonium chloride; didecyl dimethyl ammonium chloride; octyl decyl dimethyl ammonium chloride; and combinations thereof.

Polymeric ammonium salts of use may be selected from: poly(diallyldimethylammonium chloride); poly(3-chloro-2-hydroxypropyl) methacryloxyethyl dimethyl-ammonium chloride; poly(3-chloro-2-hydroxypropyl)methacryloxy-ethyl dimethyl-ammonium bromide; poly(1-methyl-4-vi-nylpyridinium bromide); cocoalkyldimethylpoly(oxyethyl) ammonium salt; dicocoalkylmethyl-poly(oxyethyl) ammo-nium salt, decyldimethylpoly(oxyethyl) ammonium salt; didecylmethylpoly(oxyethyl) ammonium salt; octyidimeth-ylpoly(oxy-ethyl) ammonium salt; dioctylmethylpoly(oxy-ethyl) ammonium salt; benzyldimethylpoly(oxyethyl) ammonium salt; and combinations thereof.

Mixtures of the disclosed quaternary ammonium com-pounds may also be of use in accordance with the present disclosure. For example, one blend of use comprises: alkyl dimethyl benzyl ammonium chloride; octyl decyl dimethyl ammonium chloride; dioctyl dimethyl ammonium chloride; and dodecyl dimethyl ammonium chloride (this blend is commercially available under the tradename Bardac™ 205/208M QAC blend from Lonza (Allendale, NJ)).

It is noted that some QAC of use in accordance with the present disclosure, may serve a dual purpose of providing disinfectant/sanitizer properties to the disinfectant/sanitizer solutions disclosed herein as well act as a surfactant. QAC that may be useful as a raw material may be present in an aqueous solution, which is then added to other components to form exemplary disinfectant/sanitizer solutions as described herein.

It is further noted that QAC are known to have a perma-nent positive charge that allows them to readily bind to the surface of microbes. As such, the presence of anionic compounds that are negatively charged in a disinfectant/sanitizer solution, may interfere with the accessibility of QAC to bind to the surface of microbes. Therefore, some exemplary disinfectant/sanitizer solutions are substantially free of anionic components including, but not limited to, anionic surfactants, anionic corrosion inhibitors and combi-nations thereof.

Exemplary concentrated disinfectant/sanitizer solutions may comprise from about 1% to about 50%, from about 2% to about 30% or from about 5% to about 20%, QAC.

Exemplary RTU disinfectant/sanitizer solutions may comprise from about 0.02% to about 2%, from about 0.005% to about 1%, from about 0.01% to about 0.5% or from about 0.02% to about 0.3% QAC.

B. Aldehyde

One or more aldehydes are present in disinfectant/sani-tizer solutions in accordance with the present disclosure. Useful aldehydes include those that are certified as Gener-ally Recognized as Safe (e.g., "GRAS"), or that may meet the eligibility requirements to be certified as "GRAS," pursuant to sections 201(s) and 409 of the United States Federal Food, Drug, and Cosmetic Act (the Act). Useful aldehydes include those having antimicrobial activity and/or those that form precursors of compounds having antimicro-bial activity. Useful aldehydes may be selected from: natu-rally-derived aldehydes; synthetic aldehydes; and combina-tions thereof. Some exemplary disinfectant/sanitizer solutions may be substantially free of aldehydes that are not GRAS certified or that cannot meet the eligibility require-ments for GRAS certification (collectively, "non-GRAS aldehydes"). Exemplary disinfectant/sanitizer solutions that are substantially free of non-GRAS aldehydes may be seen in the table set forth in FIGS. 1A and 1B.

Exemplary aldehydes of use may be selected from: cin-namaldehyde; 3,4-dihydroxycinnamic acid (e.g., caffeic acid); benzaldehyde (a degradation product of cinnamaldehyde); geranial; citral (i.e., neral); citronellal; acetaldehyde (i.e., ethanal); ethyl vanillin; piperonal (3,4-methylenedioxy-benzaldehyde, heliotropin); vanillin; decanal (i.e., N-decylaldehyde, capraldehyde, capric aldehyde, caprinaldehyde, or aldehyde C-10); and combinations thereof. Exemplary disinfectant/sanitizer solutions that comprise aldehydes that are inherently anticorrosive, may or may not further comprise corrosion inhibitors as explained hereinbelow. Exemplary disinfectant/sanitizer solutions containing one or more useful aldehydes in combination with QAC and other components as described herein may demonstrate increased microbial activity as compared to solutions having all of the same components, with the exception of the aldehyde(s). Exemplary disinfectant/sanitizer solutions may be substantially free of glutaraldehyde, while still providing desired efficacy as a disinfectant and/or sanitizer.

The presently disclosed disinfectant/sanitizer solutions may be efficacious against organisms including, but not limited to those selected from: *Staphylococcus aureus, Aspergillus fumigatus, Pseudomonas aeruginosa, Salmonella enterica, Escherichia coli, Salmonella enteritidis, Listeria monocytogenes, Trichophyton interdigitale,* Avian Influenza, PRRS, PEDV, Porcine Rotavirus, canine influenza, canine distemper, feline calicivirus and combinations thereof. Some exemplary disinfectant/sanitizer solutions may also be insecticidal and/or insect repellant as described herein.

In addition to increasing the effectiveness of QAC in the present disinfectant/sanitizer solutions, the aforementioned aldehydes may impart a pleasing scent thereto. Thus, disinfectant/sanitizer solutions in accordance with the present disclosure may be substantially free of added fragrances that may be found in some commercially available disinfectant/sanitizer products, while still providing for a scent that is pleasing to an end user.

Some exemplary disinfectant/sanitizer solutions comprise cinnamaldehyde. Cinnamaldehyde that is synthesized or naturally-derived from any source may be used in the present disinfectant/sanitizer solutions. For example, cinnamaldehyde may be naturally-derived from sources selected from: cinnamon bark extract (such as from bark and leaf); *cassia* leaf oil; *Cinnamomum cassia*; cinnamon oil; cinnamal; cinnamyl alcohol; and combinations thereof.

Cinnamaldehyde is commonly used in commercial essential oils, in which cinnamaldehyde may be present at upwards of 90%. In addition to increasing the effectiveness of QAC and imparting a pleasing scent to the present disinfectant/sanitizer solutions, it has been found that disinfectant/sanitizer compositions comprising cinnamaldehyde also demonstrate corrosion inhibition properties when applied to ferrous and non-ferrous metals. In addition, cinnamaldehyde may impart insecticidal and/or insect repellency characteristics to exemplary disinfectant/sanitizer solutions.

Some exemplary disinfectant/sanitizer solutions may comprise 3,4-dihydroxycinnamic acid (e.g., caffeic acid) alone or in combination with other useful aldehyde(s). 3,4-dihydroxycinnamic acid is similar in structure to cinnamaldehyde, but contains two more hydroxyl groups on its carbon ring.

Exemplary concentrated disinfectant/sanitizer solutions may comprise a total of from about 0.1% to about 25%, from about 1% to about 20% or from about 2% to about 15% aldehyde.

Exemplary RTU disinfectant/sanitizer solutions may comprise a total of from about 0.001% to about 2%, from about 0.002% to about 1% or from about 0.005% to about 0.5% aldehyde.

C. Surfactant

Some aldehydes may be characterized as oily compounds that have low solubility in water. Exemplary disinfectant/sanitizer solutions may comprise one or more surfactants to fully solubilize aldehyde(s) contained therein, while preventing formation of a milky white solution in which aldehyde(s) fall out of solution. Some exemplary disinfectant/sanitizer solutions comprise surfactants selected from cationic surfactant, nonionic surfactant and combinations thereof. Some exemplary disinfectant/sanitizer solutions may be substantially free of anionic surfactants as described herein.

Exemplary nonionic surfactants of use may be selected from: linear alkoxylates; alkylphenol ethoxylate polyoxypropylene-polyoxyethylene block copolymers; alkoxylated fatty alcohols (e.g., ethoxylated fatty alcohols); mid-chain branched alkyl alkoxylates; polyhydroxy fatty acid amides; ether capped poly(oxyalkylated) alcohol surfactants; amine oxides; and combinations thereof.

Exemplary classes of non-ionic surfactants of use may be selected from: ethylene oxide/propylene oxide block polymers (for example, Ecosurf™ EH-9 or Tergitol™ L-64, each of which are available from Dow Chemical (Midland, MI)); polyethoxylated sorbitan esters; fatty esters of sorbitan; ethoxylated fatty esters (comprising from 1 to 25 units of ethylene oxide); polyethoxylated $C_8$-$C_{22}$ alcohols (comprising from 1 to 25 units of ethylene oxide); polyethyoxylated $C_6$-$C_{22}$ alkylphenols (comprising from 5 to 25 units of ethylene oxide); alkylpolyglycosides; and combinations thereof.

Exemplary nonionic surfactants may be selected from: nonyl phenol ethoxylate (9EO); nonyl phenol ethoxylate (2EO); octyl phenol ethoxylate (10EO); $C_{12}$/$C_{14}$ synthetic ethoxylate (8EO); stearyl alcohol ethoxylate (7EO); cetostearyl alcohol ethoxylate (20EO); coconut fatty amine ethoxylate (10EO); sorbitan monolaurate ethoxylate (80% PO/20% EO); coconut diethanolamide; sorbitan monolaurate; sorbitan monolaurate (4EO); di-isopropyl adipate; alkyl poly glucosides, such as C6-20 or C8-10 alkyl glucosides (e.g., Surfac APG (D-Glucopyranose oligomers C8-10 alkyl glucosides, CAS 161074-97-1) available from Seppic, UK); cetostearyl stearate; and combinations thereof. Other suitable non-ionic surfactants include those selected from: Neodol 25-7 (C12/15 alcohol 7 ethoxylate (EO), CAS 68131-39-5); Surfac LM90/85 (C12/15 alcohol 9 ethoxylate (EO), CAS 68131-39-5); Surfac 65/95 (C9/11 alcohol 6.5 ethoxylate (EO), CAS 68439-45-2); Tornadol PF9 (C9/11 alcohol 6.0 ethoxylate (EO), CAS 68439-46-3); Surfac T80 Veg (Polysorbate 80, Polyoxyethylene sorbate mono oleate, CAS 9005-65-6); Tween 60 (Polysorbate 60, Polyoxyethylene sorbate mono stearate, CAS 9005-67-8); Tween 40 (Polysorbate 40, Polyoxyethylene sorbate mono palmitate, CAS 9005-66-7); Surfac T-20 (Polysorbate 20, Polyoxyethylene sorbate mono laurate, CAS 9005-64-5); Surfac PGHC (Hydrogenated Castor oil 40EO, CAS 61788-85-0); Ninol 49-CE (Coconut diethanolamide, CAS 68603-42-9); and combinations thereof.

One of skill in the art may choose an EO/PO copolymer surfactant having a Hydrophilic-lipophilic balance (i.e., an "HLB value") that is compatible with other components in disinfectant/sanitizer solutions in accordance with the present disclosure. Exemplary EO/PO copolymer surfactants of use may have an HLB value of from about 8 to about 60, from about 10 to about 20, or from about 12 to about 15. Without wishing to be bound by theory, it is believed that EO/PO copolymer in combination with cationic surfactant may fully solubilize aldehyde contained in a disinfectant/sanitizer solution, even when the aldehyde is present in the disinfectant/sanitizer solutions at relatively high levels, i.e., greater than about 15%.

Amine oxides are materials that are often referred to in the art as "semi-polar" non-ionic surfactants. Amine oxides have the following general formula:

$$R_3N(O)(CH_3)_2 \tag{II:}$$

wherein, $R_3$ is saturated or unsaturated, linear or branched, and may contain from about 8 to about 20, or from 10 to about 16 carbon atoms, or $R_3$ is a $C_{12}$-$C_{16}$ primary alkyl. The detergent compositions described herein may comprise $C_{12}$-$C_{14}$ dimethyl amine oxide. In addition to acting as a surfactant, amine oxide may further provide any desired foaming properties.

Exemplary cationic surfactants of use include, but are not limited to those selected from: tallow diamine pentamethyl dichloride; hydroxyethyl dimethyl ammonium chloride; alkylamidodimethyl propylamine; and combinations thereof.

Exemplary concentrated disinfectant/sanitizer solutions may comprise a total of from about 0.1% to about 30%, from about 1% to about 20% or from about 2% to about 10% nonionic and/or cationic surfactant.

Exemplary RTU disinfectant/sanitizer solutions may comprise a total of from about 0.001% to about 10%, from about 0.002% to about 5% or from about 0.005% to about 1% nonionic and/or cationic surfactant.

D. Solvent (Main and Co-Solvents)

Exemplary disinfectant/sanitizer solutions comprise at least two solvents—a main solvent and one or more co-solvents. As noted above, a co-solvent is present in exemplary disinfectant/sanitizer solutions in a lower amount (e.g., at a lower weight percentage) than the main solvent that is also present in the exemplary disinfectant/sanitizer solution.

Some exemplary concentrated disinfectant/sanitizer solutions may comprise water as the main solvent; such exemplary concentrated disinfectant/sanitizer solutions are "aqueous." Some exemplary disinfectant/sanitizer solutions may comprise one or more water-miscible organic solvents as the main solvent, rather than water; such exemplary disinfectant/sanitizer solutions are "non-aqueous." In exemplary non-aqueous disinfectant/sanitizer solutions, water may be a co-solvent.

Without wishing to be bound by theory, it is believed that co-solvents surround aldehyde(s) present in exemplary disinfectant/sanitizer solutions, thus working in conjunction with surfactant to form a micellar solution. It is further believed that the presence of a co-solvent and surfactant blend in exemplary disinfectant/sanitizer solutions may significantly reduce the amount of QAC and/or cationic surfactant that is tied up in a micelle formation of the aldehyde(s) (e.g., cinnamaldehyde). It is further believed that this in turn increases antimicrobial activity of exemplary disinfectant/sanitizer solutions as compared to those solutions that do not comprise the co-solvent and surfactant blend. With a micellar solution formed, it is believed that both aldehyde(s) and QAC present in the disinfectant/sanitizer solutions more effectively target microorganisms, while providing for clear disinfectant/sanitizer, without the added burden of having to formulate clear solutions comprising nanoemulsions.

A useful co-solvent may depend upon the main solvent that is used in exemplary disinfectant/sanitizer solutions. In aqueous disinfectant/sanitizer solutions, one or more compounds other than water is/are utilized as the co-solvent(s). In exemplary non-aqueous disinfectant/sanitizer solutions, water is utilized as the co-solvent.

Any suitable main solvent and co-solvent system may be utilized. Exemplary water-miscible organic solvents of use in aqueous or non-aqueous disinfectant/sanitizer solutions as either the main solvent or a co-solvent may be selected from: ethers; alcohols; glycols; glycol ethers, glycol ether acetates, glycol diethers (glymes); polyols; hydrogels; and combinations thereof. It is to be noted that technically-speaking glycols generally fall under the genus of alcohols. However, for the purposes if this disclosure and the appended claims, glycols and alcohols are treated as separate genera of solvents.

Exemplary ethers of use may be selected from: dioctyl ether (commercially available as Nacol 8 from Sasol Chemicals (Houston, TX)); dihexyl ether (commercially available as Nacol 6 from Sasol Chemicals (Houston, TX)); 1-butylpyrrolidin-2-one; and combinations thereof.

Exemplary alcohols of use may be selected from: primary alcohols, secondary alcohols, tertiary alcohols and combinations thereof. Without wishing to be bound by theory, it is believed that the presence of one or more alcohols in exemplary RTU disinfectant/sanitizer solutions as either a main solvent (or a co-solvent) may promote a relatively quicker drying time and relatively faster kill when the exemplary RTU solutions are applied to a surface, as compared to similar solutions containing no alcohol as a main solvent or co-solvent.

Exemplary primary alcohols of use may be selected from: methanol, ethanol and combinations thereof. An exemplary secondary alcohol of us includes isopropyl alcohol. An exemplary tertiary alcohol of use includes tert-Butyl alcohol.

Exemplary glycols of use may be selected from: hexylene glycol (commercially available as Hexasol® from Arkema (King of Prussia, PA)); and combinations thereof.

Exemplary glycol ethers of use may be selected from: ethylene glycol propyl ether; ethylene glycol n-butyl ether; diethylene glycol methyl ether; diethylene glycol n-butyl ether (commercially available as Butyl Carbitol® from Dow Chemical (Midland, MI)); diethylene glycol ethyl ether; triethylene glycol methyl ether; triethylene glycol ethyl ether; triethylene glycol n-butyl ether; propylene glycol methyl ether; propylene glycol n-propyl ether; dipropylene glycol methyl ether; dipropylene glycol n-propyl ether; tripropylene glycol methyl ether; polyethylene glycol phenyl ether; and combinations thereof.

Exemplary glycol ether acetates of use may be selected from: propylene glycol methyl ether acetate; dipropylene glycol methyl ether acetate; and combinations thereof.

Exemplary glycol diethers (glymes) of use may be selected from: ethylene glycol dimethyl ether; ethylene glycol diethyl ether; diethylene glycol dimethyl ether; diethylene glycol diethyl ether; triethylene glycol dimethyl ether; tetraethylene glycol dimethyl ether; and combinations thereof.

Exemplary polyols of use may be selected from: polyethylene glycol; glycerin; and combinations thereof. Exemplary polyethylene glycols of use may have any suitable average molecular weight.

It is to be noted that some solvents may contribute to the stability of exemplary disinfectant/sanitizer solutions. Such solvents include, but are not limited to, isopropyl alcohol, propylene glycol/dipropylene glycol and combinations thereof.

Exemplary concentrated disinfectant/sanitizer solutions may comprise a total of from about 30% to about 90%, from about 34% to about 89%, from about 40% to about 80% or from about 50% to about 75% of a main solvent.

Exemplary RTU disinfectant/sanitizer solutions may comprise a total of from about 40% to about 99.999%, from about 50% to about 99.95%, or from about to about 75% to about 99.8% of a main solvent.

Exemplary concentrated disinfectant/sanitizer solutions may comprise a total of from about 0.5% to about 40%, from about 1% to about 30% or from about 2% to about 20% co-solvent; It is to be noted that these percentages do not include alcohol that may be added by a user to exemplary concentrated disinfectant/sanitizer solutions when generating an RTU disinfectant/sanitizer solutions.

Exemplary RTU disinfectant/sanitizer solutions may comprise a total of from about 0.001% to about 40%, from about 0.002% to about 30% or from about 0.005% to about 10% co-solvent.

E. Corrosion Inhibitor

Some exemplary disinfectant/sanitizer solutions comprise corrosion inhibitor. Those exemplary disinfectant/sanitizer solutions that comprise an aldehyde and/or other component that has anticorrosive properties (e.g., cinnamaldehyde), may comprise one or more additional corrosion inhibitors as described herein. Likewise, those exemplary disinfectant/sanitizer solutions that do not contain component(s) having anticorrosive properties, may comprise one or more corrosion inhibitors as described herein.

Useful corrosion inhibitors may include those that are known to one of ordinary skill in the art, so long as they do not significantly interfere with the antimicrobial nature of QAC. For example, corrosion inhibitors that are anionic may fully or partially deactivate QAC contained in the disinfectant/sanitizer solution.

Exemplary corrosion inhibitors of use may be selected from: 2-phosphono-1,2,4-butanetricarboxylic acid or a sodium salt thereof (commercially available respectively as Bayhibit® AM and Bayhibit® S from LANXESS (Westlake, OH)), phosphate ester (commercially available as Cola®Fax 3383 from Colonial Chemical, Inc. (South Pittsburgh, TN)) and combinations thereof.

Exemplary concentrated disinfectant/sanitizer solutions may comprise a total of from about 0.1% to about 5%, from about 0.2% to about 4%, from about 0.3% to about 3%, or from about 0.5% to about 1% corrosion inhibitor.

Exemplary RTU disinfectant/sanitizer solutions may comprise a total of from about 0.0007% to about 0.1%, from about 0.001% to about 0.0.05%, or from about 0.007% to about 0.01% corrosion inhibitor.

F. Stability Enhancer

Some exemplary disinfectant/sanitizer solutions further comprise one or more stability enhancers. Exemplary stability enhancers of use may be selected from: solvents, radical scavenger (including anti-oxidants), pH adjuster and combinations thereof.

Some stability enhancers may have multiple functions as a stability enhancer (e.g., may function as both a pH adjuster and a radical scavenger) and/or may also have another function in exemplary disinfectant/sanitizer solutions. For example, some solvents as described herein above may also lend stability to exemplary disinfectant/sanitizer solutions. Without wishing to be bound by theory, it is believed that some solvents may create a more ideal environment for aldehyde(s), e.g., cinnamaldehyde, in the exemplary solutions, shifting equilibrium within the solutions in favor of aldehyde, e.g., cinnamaldehyde, stability (for example, by replacing water, which may destabilize aldehydes). It is to be noted that the total weight percentages of solvents that also act as stability enhancers in exemplary disinfectant/sanitizer solutions are accounted for in part D above.

It is to be further noted that for exemplary disinfectant/sanitizer solutions comprising amine oxide, it can be advantageous to include one or more stability enhancers for the following reasons. Without wishing to be bound by theory, it is believed that amine oxide may contain a relatively low amount of hydrogen peroxide due to the process that is utilized to manufacture it. Exemplary disinfectant/sanitizer solutions comprising amine oxide may further comprise stability enhancer(s) that may degrade hydrogen peroxide and other hydroxyl radicals present in the solutions to protect any aldehyde that is contained therein (e.g., cinnamaldehyde) from degradative attack.

Exemplary radical scavengers of use may be selected from: alkyl gallates; hindered phenols; hydroquinone; trihydroxy butyrophenone; and combinations thereof. Exemplary anti-oxidants of use may be selected from: vitamin C; vitamin E; gallic acid; sodium citrate; and combinations thereof.

Alkyl gallates of use may be selected from: ethyl gallate; propyl gallate; octyl gallate; dodecyl gallate; and combinations thereof.

Hindered phenols of use may be selected from: tertiary butylhydroquinone ("TBHQ"); tocopherols; tocopherol ester derivatives; and combinations thereof.

Tocopherol ester derivatives of use may be selected from: tocopheryl acetate; tocopheryl linoleate; tocopheryl nicotinate; tocopheryl succinate; and combinations thereof.

Exemplary pH adjusters of use may be selected from: formic acid; acetic acid; lactic acid; citric acid; glycolic acid; sulfamic acid; phosphoric acid; sodium hydroxide; potassium hydroxide; ammonium hydroxide; ammonia; amines; ethanolamine; diethanolamine; triethanolamine; aminomethyl propanol; aminomethyl propanediol; diisopropanolamine; and combinations thereof. It is to be noted that sodium salts of the foregoing acids may also be used as pH adjusters.

Disinfectant/sanitizer solutions in accordance with the present disclosure may have any useful pH as determined by one of ordinary skill in the art. Exemplary disinfectant/sanitizer solutions may have a pH ranging from about from about 3 to about 12 or from about 4 to about 8.

Exemplary concentrated disinfectant/sanitizer solutions may comprise a total of from about 0.001% to about 5%, from about 0.025% to about 0.3% or from about 0.05% to about 0.1% of one or more radical scavengers and/or pH adjusters.

Exemplary RTU disinfectant/sanitizer solutions may comprise a total of from about 0.00001% to about 10%, from about 0.0001% to about 5%, or from about 0.001% to about 0.01% of one or more radical scavengers and/or pH adjusters.

G. Chelant

Some exemplary disinfectant/sanitizer solutions further comprise one or more chelants. Exemplary chelants of use may be selected from: tetrasodium ethylenediaminetetraacetic acid (commercially available as Dissolvene 100-S from Nouryon (Netherlands)); disodium ethylenediaminetetraacetic acid; hydroxyethylidene diphosphonic acid (commercially available as Dequest® 2010 from Italmatch (Smyrna, GA)); diethylenetriamine penta(methylene phosphonic acid), sodium salt (commercially available as Dequest® 2066 from Italmatch (Smyrna, GA)); sodium gluconate; and combinations thereof.

Exemplary concentrated disinfectant/sanitizer solutions may comprise a total of from about 0.01% to about 10%, from about 0.1% to about 5% or from about 0.5% to about 3% chelant.

Exemplary RTU disinfectant/sanitizer solutions may comprise a total of from about 0.001% to about 0.5%, from about 0.005% to about 0.1% or from about 0.01% to about 0.05% chelant.

Exemplary disinfectant/sanitizer solutions may be applied to a substrate to be treated (e.g., a hard surface) using conventional application techniques. Conventional techniques include, but are not limited to, spraying, pouring, squirting and/or wiping the disinfectant/sanitizer solution on a substrate, soaking the hard surface in the disinfectant/sanitizer solution and/or dipping the hard surface into the disinfectant/sanitizer solution. Exemplary disinfectant/sanitizer solutions may be provided to an end user as a concentrate to be applied to directly to a surface or diluted by an end user prior to application to a surface, or as an RTU solution in a container that may include an application means. For example, disinfectant/sanitizer solutions may be provided in a container which is pressurized as an aerosol, a container with a trigger or pump sprayer, as a squirt container or in conventional containers with a removable cap that allows the user to pour the formulation onto a substrate.

Alternatively, some exemplary disinfectant/sanitizer solutions may be impregnated into a substrate, to form a "wipe." Exemplary wipes may be stored in a container that will dispense the wipe to an end user. A container may contain a single wipe or several wipes. Some exemplary containers comprise a pouch containing a single wipe, much like a moistened towelette. Some exemplary pouches may be torn open by an end user to access the wipe. Some exemplary pouches may comprise a resealable opening containing a plurality of wipes disposed in a stacked fashion or other suitable configuration that would allow wipes to be removed from the resealable opening one at a time. Pouches may be prepared from a fluid impervious material, such as a film, a coated paper or foil or other similar fluid impervious materials. Some exemplary wipes may be contained in a fluid impervious container having an opening through which wipes contained therein may be accessed. Exemplary containers may comprise a molded plastic container with a lid that is fluid impervious. The lid may comprise an opening through which wipes inside the container are accessed. In some exemplary containers, wipes may be arranged in an interleaved stack, so that as a first wipe is removed from the container, a second wipe is positioned in the opening of the container and such that it is ready to be removed by the end user. In other exemplary containers, wipes may comprise a continuous material that is perforated at regular intervals such that the material between the perforations constitute the wipes. The continuous wipe material with perforations may be in a folded form or may be in a rolled form. Generally, in the rolled form, a wipe material is fed from a center of the rolled material. In any case, as a first wipe is removed from the container, it is torn at the perforations after the portion of the continuous material that will constitute the second wipe is positioned in the opening for later use as needed.

Disposable wipes may provide certain advantages over other application vehicles, such as a reusable sponge, rag or the like. Unlike sponges, rags and the like, which are used repeatedly, an impregnated wipe may be used a single time and discarded. Thus, the present wipes may eliminate disadvantages associated with applications of disinfectants/sanitizer solutions via a reused sponge or rag.

Exemplary disinfectants/sanitizer solutions may be impregnated into a wipe such that the wipe is pre-moistened and will express or release the solutions on to a substrate as the wipe is applied to a substrate to be treated. Generally, the disinfectants/sanitizer are released by an end user when the impregnated wipes are applied to and wiped across a surface.

Suitable wipe substrates that are compatible with exemplary disinfectants/sanitizer solutions may be selected by one of skill in the art. Useful wipe substrates may comprise materials selected from: woven material; and nonwoven material. Exemplary nonwoven materials may include, but are not limited to: meltblown; coform; spunbond; airlaid; hydroentangled nonwovens; spunlace; bonded carded webs. Exemplary nonwovens may comprise a single layer of material or a laminate of materials. Exemplary laminates may comprise multiple layers of a single material or multiple layers of different materials. Fibers used to prepare a wipe substrate may comprise fibers selected from: cellulosic fibers; thermoplastic fibers; and mixtures thereof. Fibers of use may further be selected from: continuous fibers; discontinuous fibers; staple fibers; and mixtures thereof. Basis weights of exemplary nonwovens of use may vary from about 12 grams per square meter to 200 grams per square meter or more.

An exemplary method of use of a wipe may comprise: removing the wipe from a pouch or container; applying the wipe to a hard surface to be treated; wiping the wipe across the hard surface; expressing disinfectants/sanitizer solution from the wipe onto the hard surface; and allowing the disinfectant/sanitizer solution to remain on the surface for a period of time. Some exemplary methods further comprise allowing the hard surface to dry, whereas other exemplary methods further comprise drying the surface by wiping the hard surface with a dry wipe or wiping device, particularly one that has not been previously used.

When an exemplary disinfectant/sanitizer solution is applied to a hard surface using any of the means described herein (e.g., including, but not limited to, by spraying (a non-limiting example of spraying includes spraying an aerosolized disinfectant/sanitizer solution), by foaming, by fogging, by soaking, by dipping or by wiping), disinfection of the surface may be achieved in a period of time that is greater than 0 minutes and less than or equal to 10 minutes, and sanitization of the surface may be achieved in a period of time that is that is greater than 0 minutes and less than or equal to 5 minutes.

Examples and Data

Exemplary disinfectant/sanitizer solutions may be made as follows. A main solvent is added to a mixing vessel and stirred. While continuing to stir, these components are added to the mixing vessel in the following order from first to last: co-solvent, aldehyde and surfactant. After solvent, aldehyde and surfactant have been added to the mixing vessel, QAC is slowly added to the mixing vessel while continuing to stir until the solution contained in the mixing vessel becomes clear. While continuing to stir, any remaining QAC is then added to the mixing vessel and mixed for several minutes, thus resulting in an exemplary disinfectant/sanitizer solution. It is to be noted that utilizing this method, exemplary concentrated or RTU disinfectant/sanitizer solutions may be made. It is also to be noted that by utilizing the disclosed method, concentrated or RTU disinfectant/sanitizer solutions that are clear, may be made.

Wipe

Any of exemplary disinfectant/sanitizer solutions A through MM as shown in the table contained in FIGS. 1A and 1B, are prepared and a nonwoven substrate is saturated therewith to form a wipe. The nonwoven substrate may be made from any suitable materials and bonded using any suitable techniques to provide for a wipe as is known by one of ordinary skill in the art, so long as the resulting wipe meets its intended purpose of being wetted/saturated/impregnated with exemplary disinfectant/sanitizer solutions and expressing at least a portion of the exemplary disinfectant/sanitizer solutions to a surface to be treated.

One exemplary wipe comprises a commercially available spunlace polyester having a basis weight ("bw") of 45 grams per square meter ("gsm") (commercially available as SX-145, 100% polyester wipe substrates without binder, 45 gsm, non-apertured spunlace material from Suominen (Helsinki, Finland)). To saturate (i.e., impregnate) the nonwoven substrate, the nonwoven substrate is saturated with disinfectant/sanitizer solutions at a ratio of about 5:1 liquid weight to nonwoven substrate weight. If the resulting saturated nonwoven substrate forms a single, discrete wipe, it is enclosed in a pouch. If the resulting saturated nonwoven substrate forms continuous nonwoven material with perforations, it is stored in a container as described above.

Additional exemplary commercially available materials of use to construct wipes may be selected from those comprising: 50% Cellulose/50% Polyester (36-64 gsm); 70% Cellulose/30% Polypropylene (45-55 gsm); 100% Polypropylene (30.9-40 gsm); and 50% Cellulose/30% Polypropylene/20% Polyester (40-50 gsm).

Spray, Foam, Dip, Soak or Fog

Any of exemplary disinfectant/sanitizer solutions A through MM as described herein, are prepared in the form of a solution that may be applied to a hard surface by spraying (e.g., including, but not limited to spraying an aerosol), foaming or fogging the solution and/or by dipping and/or soaking a hard surface in a solution. A non-limiting example of a sprayable disinfectant/sanitizer solution is an aerosolized disinfectant/sanitizer solution. In any case, a method of disinfecting a hard surface comprises: applying the solution to a hard surface; and allowing the solution to remain on the hard surface for more than 0 minutes and less than or equal to 10 minutes. A method of sanitizing a surface comprises applying the solution to a hard surface; and allowing the solution to remain on the hard surface for more than 0 seconds and less than or equal to 5 minutes. The methods of disinfecting and sanitizing a hard surface may further comprise rinsing the hard surface with water (either by applying water directly to the hard surface, or wiping the hard surface with a clean substrate moistened with water). The aforementioned methods may further comprise diluting a concentrated disinfectant/sanitizer solution prior to applying it to the hard surface. In an exemplary method of disinfecting a hard surface, 1 ounce of concentrated disinfectant/sanitizer solution may be diluted with 128 ounces (1 gallon) of water, prior to applying it to the hard surface. In an exemplary method of sanitizing a hard surface, 1 ounce of concentrated disinfectant/sanitizer solution may be diluted with 256 ounces of water, prior to applying it to the hard surface.

Metering

In some exemplary methods, concentrated disinfectant/sanitizer solutions may be diluted prior to application to a hard surface as is known in the art. Such dilution may occur in environments including, but not limited to, in hatcheries, in equipment (e.g., truck) washes and in/on swine farms prior to application to a hard surface. For example, concentrated disinfectant/sanitizer solutions may be metered into a tank at a specified metering rate to be sprayed, foamed or fogged. In a further example, a concentrated disinfectant/sanitizer solution may be dispensed through a drum pump to a known amount and mixed with water resulting in the desired dilution. In a further example, disinfectant/sanitizer solution may be dispensed into and mixed with water to a desired dilution using a wall mixing station and then dispensed into a container, foaming apparatus, etc., for application to a hard surface.

Referencing the table in FIGS. 1A and 1B, exemplary disinfectant/sterilization solutions A through MM, and comparative examples 1 and 2, are made as described above. It is to be noted that weight percentages of components identified in FIGS. 1A and 1B are set forth as the weight percentages of the commercially available raw materials that contain the component and that are used to make the disclosed compositions. As such, the weight percentages of components identified in FIGS. 1A and 1B may include solvents or by-products are present in the commercially available materials.

The effect of the presence of aldehyde in a QAC-containing solution is tested using the standard operating procedure for AOAC—Use Dilution Method for Testing Disinfectants (SOP Number MB-05-14; Date Revised: Aug. 11, 2016), which is conducted utilizing 400 ppm hard water and 5% fetal bovine serum. Referring to FIGS. 1A and 1B, the following solutions are made: Example A, and Comparative Example 1. Results of the testing are set forth in Table 1.

TABLE 1

| Organism | Example | Pass/Fail |
|---|---|---|
| *P. aeruginosa* ATCC 15442 | Example A | Fail |
| *P. aeruginosa* ATCC 15442 | Comparative Example 1 | Pass |

The data in Table 1 demonstrate the efficacy of an exemplary disinfectant/sanitizer solution containing both aldehyde and QAC, Example A, vs. the efficacy of a comparative solution that does not contain aldehyde, Comparative Example 1. As can be seen in Table 1, efficacy of a solution comprising QAC as the sole active antimicrobial component against *Pseudomonas aeruginosa*, is greater than the efficacy of a solution comprising QAC and cinnamaldehyde as the active antimicrobial ingredients. These data suggest that cinnamaldehyde has a negative impact on the efficacy of QAC against *Pseudomonas aeruginosa*.

The effects of dilution of concentrated disinfectant/sanitizer solutions and the presence of co-solvent therein, are also tested using the standard operating procedure for the AOAC—Use Dilution Method for Testing Disinfectants (SOP Number MB-05-14; Date Revised: Aug. 11, 2016), which is conducted utilizing 400 ppm hard water and 5% fetal bovine serum. Referring to FIGS. 1A and 1B, the following solutions are made: Example B, Example C and Comparative Example 2. Results of the testing of the solutions are set forth in Table 2.

TABLE 2

| Example ID | Pass/Fail |
|---|---|
| Example B | Pass |
| Comparative Example 2 | Fail |
| Example C | Pass |

The data in Table 2 demonstrate the efficacy of exemplary and comparative solutions against *Pseudomonas aeruginosa* that are present on hard surfaces. As can be seen from the data, solutions that comprise co-solvent according to the present disclosure, i.e., Examples B and C, pass the efficacy test, whereas comparative solutions that do not comprise co-solvent, i.e., Comparative Example 2, does not. These data suggest that a micellar solution formed by the addition of co-solvent in conjunction with surfactant to solutions comprising QAC and cinnamaldehyde may result in increased antimicrobial activity of the QAC and cinnamaldehyde.

The fungicidal activity of an exemplary disinfectant/sanitizer solution is tested using the standard operating procedure for the AOAC Official Method 955.17—Fungicidal Activity of Disinfectants. Referring to FIGS. 1A and 1B, several exemplary disinfectant/sanitizer solutions are made. In accordance with the AOAC fungicidal activity of disinfectants method, in order for a disinfectant to pass the test for fungicidal activity, no growth can be observed 10 minutes after the disinfectant has been aliquoted into the primary growth tubes and in the secondary growth tubes. As can be seen in Table 3, when the fungicidal activity of the exemplary disinfectant/sanitizer solutions is tested against *Trichophyton interdigitale*, they pass the test.

TABLE 3

| | | Primary | | | Secondary | | |
|---|---|---|---|---|---|---|---|
| | Example | 5 minutes | 10 minutes | 15 minutes | 5 minutes | 10 minutes | 15 minutes |
| *Trichophyton* | A-MM | (−) | (−) | (−) | (−) | (−) | (−) |
| interdigitale | | (−) | (−) | (−) | (−) | (−) | (−) |
| ATCC 9533 | | (−) | (−) | (−) | (−) | (−) | (−) |

(+) growth in tube
(−) no growth in tube

In accordance with the AOAC Use Dilution Method for Testing Disinfectants (SOP Number MB-05-14; Date Revised: Aug. 11, 2016), which is conducted utilizing 400 ppm hard water and 5% fetal bovine serum, antimicrobial efficacy of exemplary disinfectant/sanitizer solutions in accordance with FIGS. 1A and 1B is further tested against *Pseudomonas aeruginosa, Staphylococcus aureus, Salmonella enterica, Escherichia coli* and *Salmonella enteritidis*. Antimicrobial efficacy of exemplary disinfectant/sanitizer solutions in accordance with FIGS. 1A and 1B is further tested against *Listeria monocytogenes* and Methicillin-resistant *Staphylococcus aureus*. Results of the testing are set forth in Table 4:

TABLE 4

| Organism | Example | Pass/Fail |
|---|---|---|
| *P. aeruginosa* ATCC 15442 | B-E, H-M, O, U, V, BB-MM | Pass |

TABLE 4-continued

| Organism | Example | Pass/Fail |
|---|---|---|
| *S. aureus* ATCC6538 | B-E, H-M, O, U, V, BB-MM | Pass |
| *S. enterica* ATCC 10708 | B-E, H-M, O, U, V, BB-MM | Pass |
| *E. coli* ATCC 11229 | B-E, H-M, O, U, V, BB-MM | Pass |
| *S. enteritidis* ATCC 13076 | B-E, H-M, O, U, V, BB-MM | Pass |
| *L. monocytogenes* ATCC | B-E, H-M, O, U, V, BB-MM | Pass |
| MRSA ATCC | B-E, H-M, O, U, V, BB-MM | Pass |

As can be seen from the data in Tables 3 and 4, exemplary disinfectant/sanitizer solutions in accordance with the table shown in FIGS. 1A and 1B, have broad spectrum activity against gram negative, gram positive and fungal organisms.

In accordance with the ASTM Virucidal Efficacy of a Disinfectant for Use on Inanimate Environmental Surfaces (ASTM E1053) which is conducted utilizing 400 ppm hard water and 5% fetal bovine serum, virucidal efficacy of exemplary disinfectant/sanitizer solutions in accordance with FIGS. 1A and 1B is further tested against Avian Influenza, Porcine Reproductive and Respiratory Syndrome virus, Porcine Epidemic Diarrhea Virus, Porcine Rotavirus, Canine Influenza, Canine Distemper Virus, and Feline Calicivirus. Results of the testing are set forth in Table 5:

TABLE 5

| Virus | Example | Results (Pass/Fail) |
|---|---|---|
| Avian Influenza | B-E, H-M, O, U, V, BB-MM | Pass |
| Porcine Reproductive and Respiratory Syndrome (PRRS) | B-E, H-M, O, U, V, BB-MM | Pass |
| Porcine Epidemic Diarrhea Virus (PEDV) | B-E, H-M, O, U, V, BB-MM | Pass |
| Porcine Rotavirus | B-E, H-M, O, U, V, BB-MM | Pass |
| Canine Influenza | B-E, H-M, O, U, V, BB-MM | Pass |

TABLE 5-continued

| Virus | Example | Results (Pass/Fail) |
|---|---|---|
| Canine Distemper Virus | B-E, H-M, O, U, V, BB-MM | Pass |
| Feline Calicivirus | B-E, I-M, BB-MM | Pass |

As can be seen from the data in Table 5, exemplary disinfectant/sanitizer solutions have broad spectrum virucidal activity against enveloped and non-enveloped viruses.

Example D in accordance with FIG. 1A is tested as follows for material compatibility against coupons of the following materials: Aluminum 1100, Naval Brass, Bronze and Chrome-plated metal. Example E in accordance with FIG. 1A is also tested as follows for the material compatibility against coupons of the following materials: Galvanized Steel, HDPE, LDPE, Polypropylene, PTFE, PVC, Delrin, Polycarbonate, Acrylic, Viton, EPDM. Each of the materials to be tested is scrubbed with a neutral cleaning solution and rinsed with deionized water. Physical appearance and weight of each material is recorded before the test. All coupons are immersed in either DI water or in Example D or in Example E at a 1 oz/gallon dilution for 7 days (168 hours) at ambient temperature, which is believed to correspond to: (a) a surface being subjected to treatment with in-use solution for 10 consecutive minutes per day, every day for 2.8 years; or (b) a surface being treated for a consecutive period of 10 minutes per week, every week, for 19.4 years. Fresh test solutions are prepared and changed every 24 hours during the 7-day period to assure product efficacy levels for the entire duration of the study. At 168 hours of immersion, the coupons are removed from the solution, scrubbed and reweighed. Physical appearance and texture are recorded. Photos of each of the material coupons before and after testing with the exemplary compositions are taken. Likewise, photos of some of the material coupons that are only exposed to a water control may be taken.

Figure 2B:
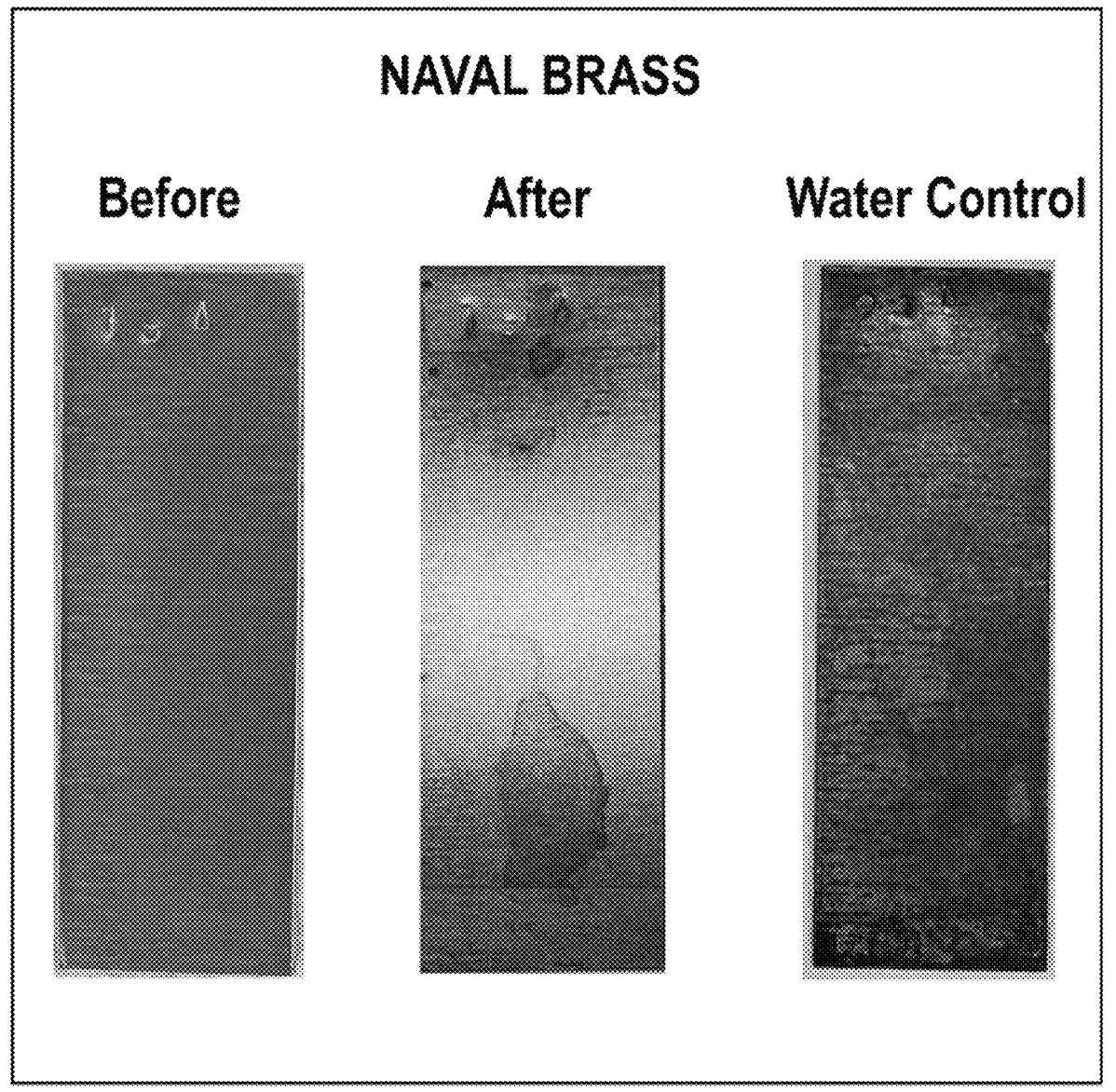
Figure 2C:
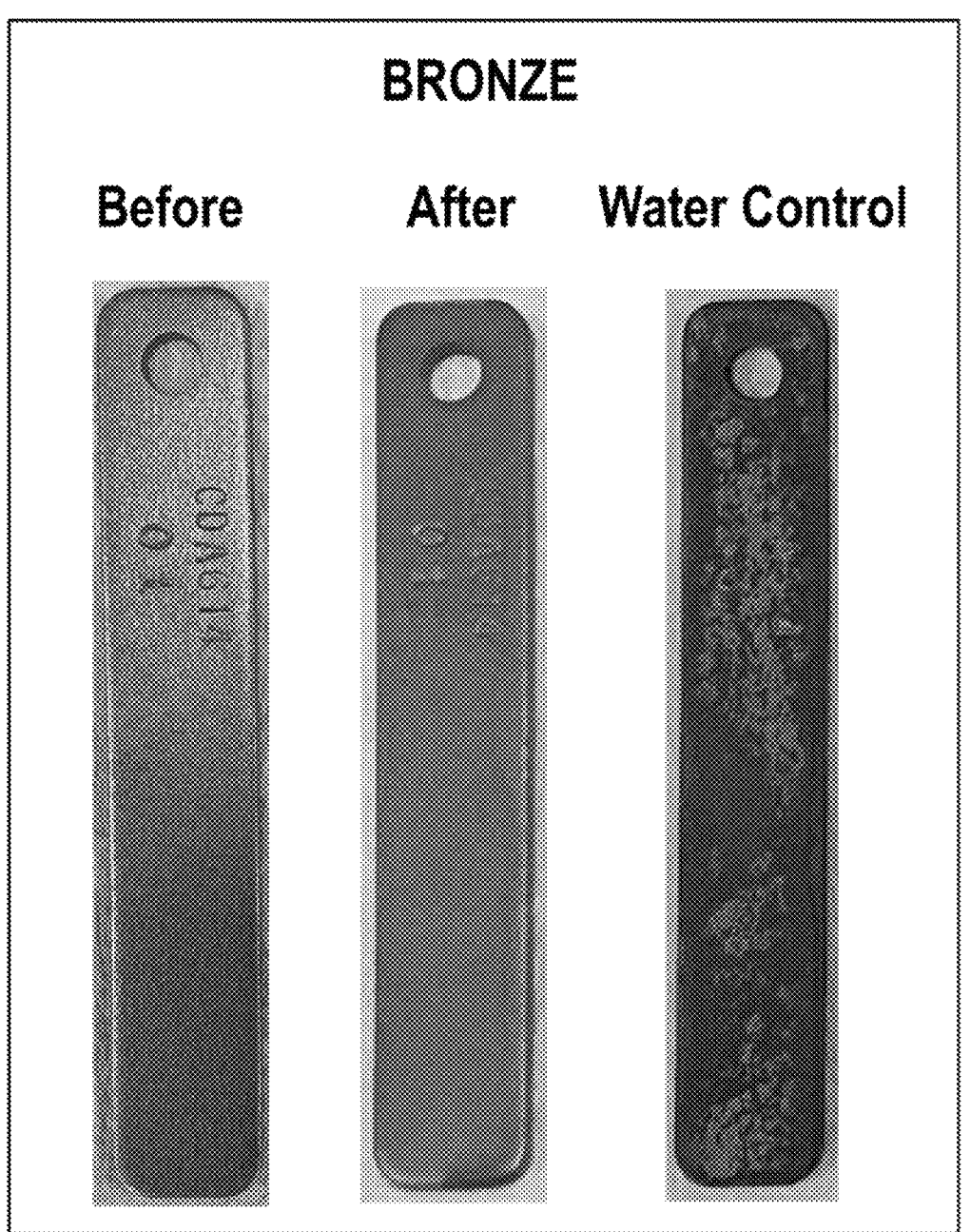
Figure 2D:
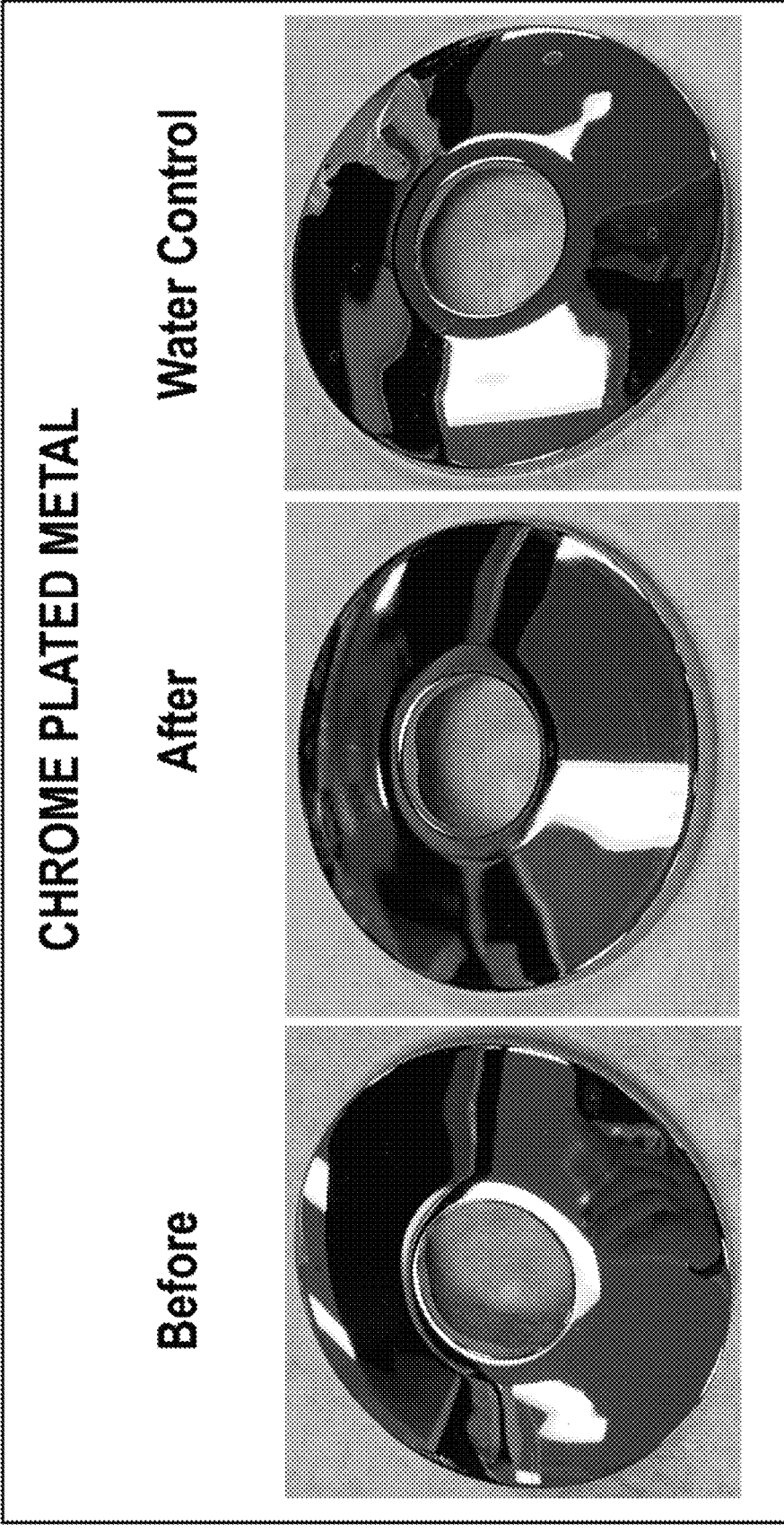

Photos depicting the results of material compatibility testing of Example D are set forth in FIGS. 2A through 2D. In each of FIGS. 2A through 2D, the left photo shows a coupon before treatment, the middle photo shows the coupon after treatment and the right photo shows the coupon exposed to a water control. FIG. 2A shows the test results for aluminum 1100, FIG. 2B shows the test results for naval brass, FIG. 2C shows the test results for bronze, and FIG. 2D shows the test results for chrome-plated metal.

Figure 3A:
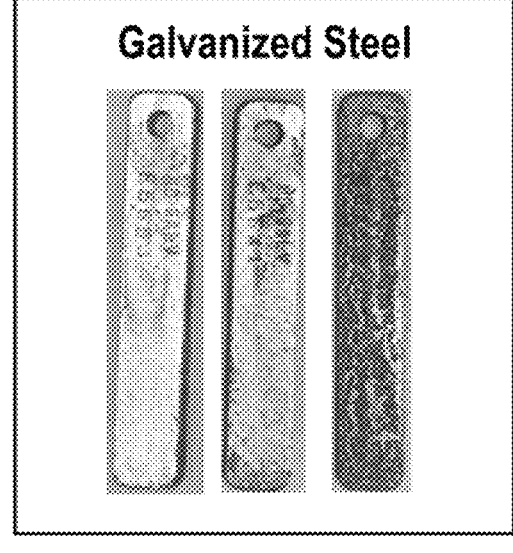
FIGS. 3A through 3K show the results of material compatibility testing of various materials with a second exemplary composition.
Figure 3B:
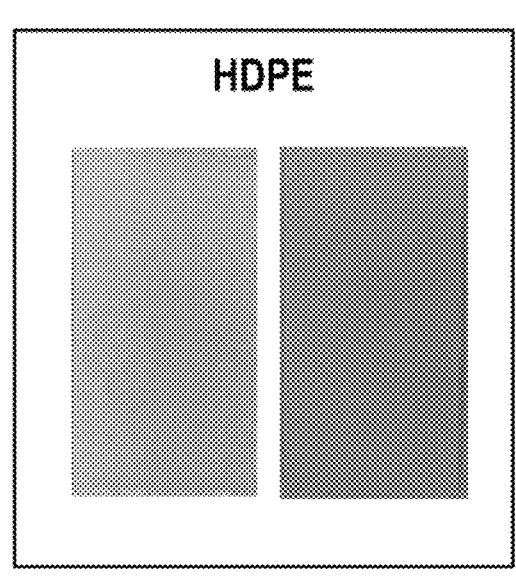
Figure 3C:
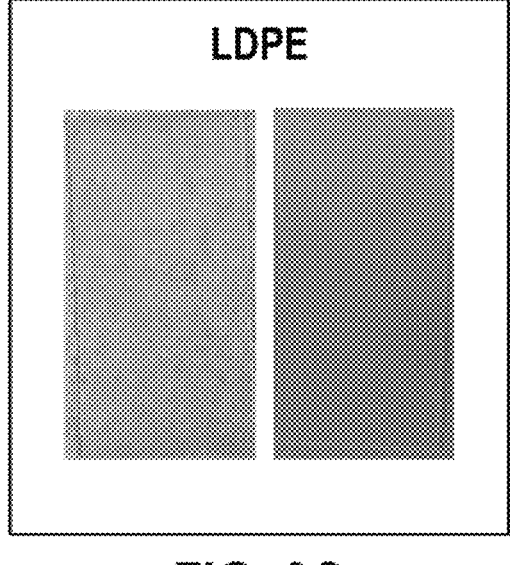
Figure 3D:
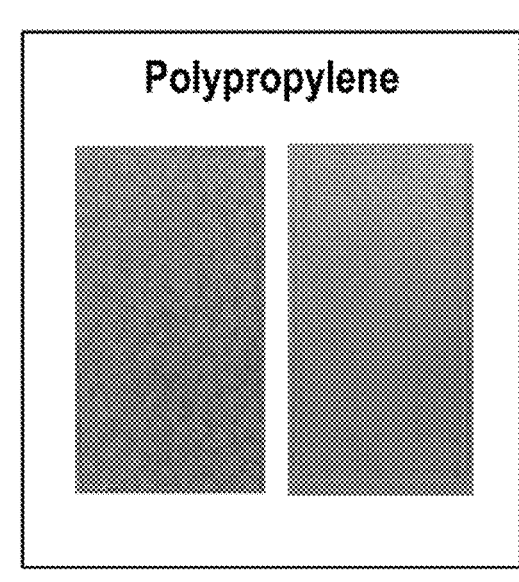
Figure 3E:
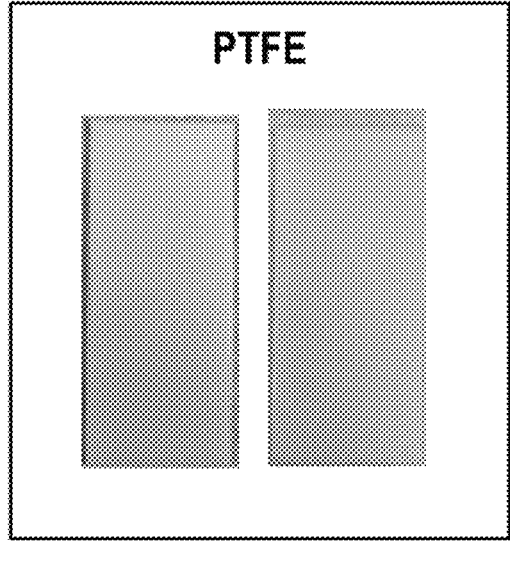
Figure 3F:
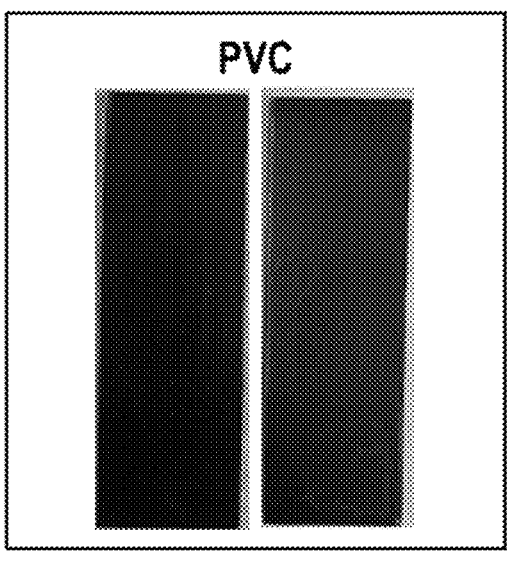
Figure 3G:
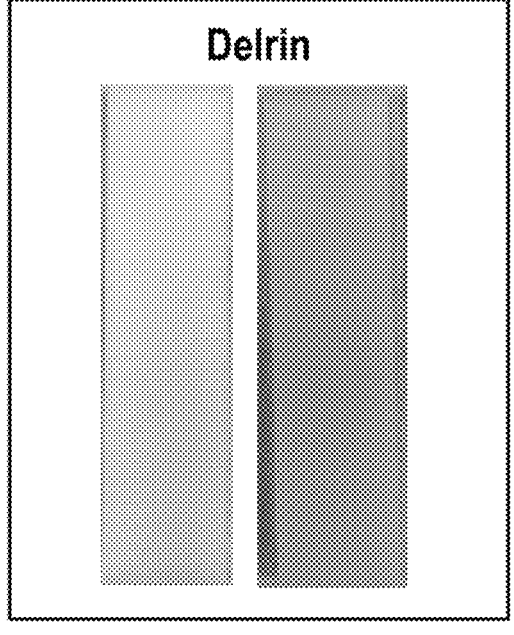
Figure 3H:
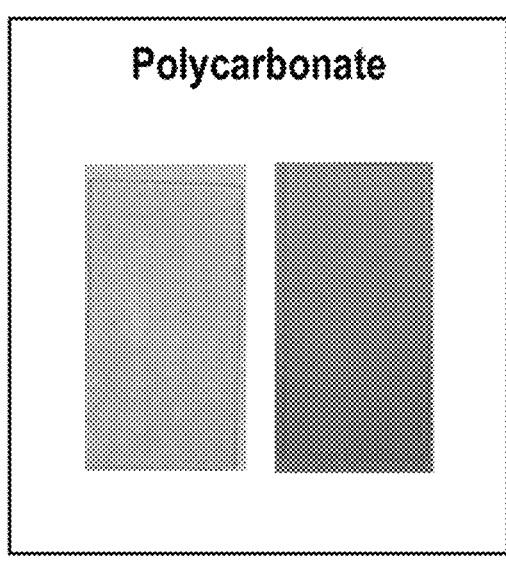
Figure 3I:
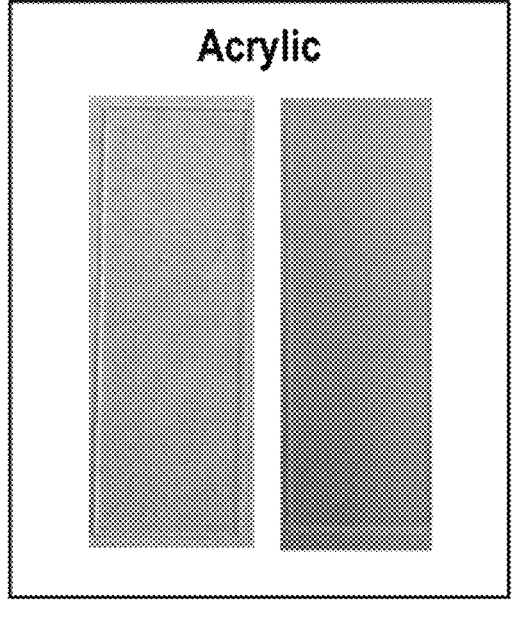
Figure 3J:
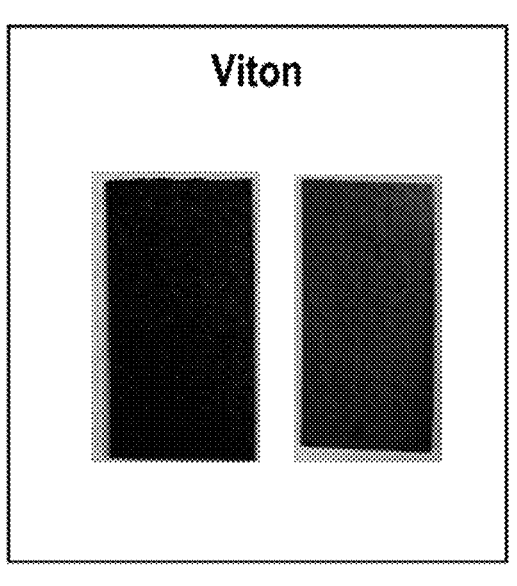
Figure 3K:
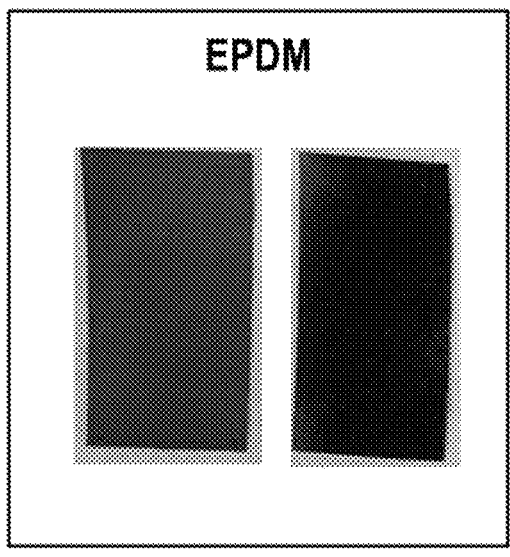

Photos depicting the results of material compatibility testing of Example E are set forth in FIGS. 3A through 3K. In FIG. 3A, the left photo shows a coupon before treatment, the middle photo shows the coupon after treatment and the right photo shows the coupon exposed to a water control. In FIGS. 3B through 3K, the left photo shows a coupon before treatment and the right photo shows the coupon after treatment. FIG. 3A shows the results for Galvanized Steel, FIG. 3B shows the results for HDPE, FIG. 3C shows the results for LDPE, FIG. 3D shows the results for Polypropylene, FIG. 3E shows the results for PTFE, FIG. 3F shows the results for PVC, FIG. 3G shows the results for Delrin, FIG. 3H shows the results for Polycarbonate, FIG. 3I shows the results for Acrylic, FIG. 3J shows the results for Viton, and FIG. 3K shows the results for EPDM. Upon visual inspection of the photos, it is apparent that the exemplary compositions are not corrosive.

Insect repellency of exemplary disinfectant/sanitizer solutions may be demonstrated via field trials (application and sampling of an insect population over time) and/or via laboratory testing, including, but not limited to, the industry standard tests listed below, all of which are incorporated by reference herein:

1) Ebeling Choice Box Test (cockroach repellency)
2) OCSPP 810.3500 Premises Treatments (fly and cockroach kill)
3) OECD Series 183—Assays for Testing the Efficacy of Baits Against Cockroaches
4) ASTM E654-96—Standard Test Method for Effectiveness of Aerosol and Pressurized Spray Insecticides Against Cockroaches
5) Internally developed exposure kill test
6) Internally developed residual kill test To test insect repellency of a solution, a protocol that is similar to the Ebeling Choice Box Test is followed. Repellency of a solution is defined as the mean percentage of living insects (cockroaches) in the light compartment during photo-phase after 7, 21 and 30 days, with 6 replicates tested at each time point. Results of testing of Example D and Comparative Example 1, per FIGS. 1A and 1B, are set forth in Table 6 in terms of the percentage of repellency.

TABLE 6

| Example ID | Day 0 | Day 1 | Day 7 | Day 21 | Day 30 |
|---|---|---|---|---|---|
| Example D | 10% | 20% | 80% | 85% | 85% |
| Comparative Example 1 | 15% | 20% | 20% | 15% | 10% |

Additional Examples

A first exemplary concentrated disinfectant/sanitizer solution comprising by weight percentage of the concentrated disinfectant/sanitizer solution:

(a) from about 1% to about 50%, from about 2% to about 30% or from about 5% to about 20%, of a quaternary ammonium compound having the following general formula (I):

$$R_1R_2R_3R_4N+X-$$

wherein, $R_1$, $R_2$, $R_3$ and $R_4$ represent independently of each other, alkyl groups, aliphatic groups, aromatic groups, alkoxy groups, polyoxyalkylene groups, alkylamido groups, hydroxyalkyl groups, aryl groups, and $H^+$ ions, each with from 1 to 22 carbon atoms, with the proviso that at least one of the groups $R_1$, $R_2$, $R_3$ and $R_4$ has at least eight carbon atoms and wherein X– represents an anion;

(b) from about 0.1% to about 25%, from about 1% to about 20% or from about 2% to about 15% of an aldehyde;

(c) from about 0.1% to about 30%, from about 1% to about 20% or from about 2% to about 10% of a surfactant selected from: nonionic surfactant, cationic surfactant and combinations thereof;

(d) from about 30% to about 90%, from about 34% to about 89%, from about 40% to about 80% or from about 50% to about 75% of a Main Solvent; and (e) from about 0.5% to about 40%, from about 1% to about 30% or from about 2% to about 20% of a Co-Solvent.

A second exemplary concentrated disinfectant/sanitizer solution according to the first exemplary concentrated disinfectant/sanitizer solution or any of the following concentrated disinfectant/sanitizer solutions, wherein the quaternary ammonium compound is selected from: mono alkyl trimethyl ammonium compounds, mono alkyl dimethyl benzyl ammonium salts, dialkyl dimethyl ammonium salts, heteroaromatic ammonium salts, polysubstituted quaternary ammonium salts, bisquaternary ammonium salts, polymeric ammonium salts and combinations thereof.

A third exemplary concentrated disinfectant/sanitizer solution according to either one of the first and second exemplary concentrated disinfectant/sanitizer solutions or any of the following concentrated disinfectant/sanitizer solutions, wherein the aldehyde is GRAS certified and either has antimicrobial activity or forms a precursor of a compound having antimicrobial activity.

A fourth exemplary concentrated disinfectant/sanitizer solution according to any of the first through third exemplary concentrated disinfectant/sanitizer solutions or any of the following concentrated disinfectant/sanitizer solutions, wherein the aldehyde is selected from: cinnamaldehyde, 3,4-dihydroxycinnamic acid, benzaldehyde, geranial, citral (i.e., neral), citronellal, acetaldehyde; ethyl vanillin; piperonal; vanillin; decanal (i.e., N-decylaldehyde, capraldehyde, capric aldehyde, caprinaldehyde, or aldehyde C-10); and combinations thereof.

A fifth exemplary concentrated disinfectant/sanitizer solution according to any one of the first through fourth exemplary concentrated disinfectant/sanitizer solutions or any of the following concentrated disinfectant/sanitizer solutions, wherein the surfactant is selected from cationic surfactant, nonionic surfactant and combinations thereof.

A sixth exemplary concentrated disinfectant/sanitizer solution according to any one of the first through fifth exemplary concentrated disinfectant/sanitizer solutions or any of the following concentrated disinfectant/sanitizer solutions, wherein the surfactant is an EO/PO copolymer surfactant having an HLB value of from about 8 to about 60, from about 10 to about 20, or from about 12 to about 15.

A seventh exemplary concentrated disinfectant/sanitizer solution according to any one of the first through sixth exemplary concentrated disinfectant/sanitizer solutions or any of the following concentrated disinfectant/sanitizer solutions from the ninth and further exemplary concentrated disinfectant/sanitizer solutions below, wherein the disinfectant/sanitizer solution is an aqueous and comprises one or more Co-Solvents selected from: ethers; alcohols, glycols; glycol ethers, glycol ether acetates, glycol diethers; polyols; hydrogels; and combinations thereof.

An eighth exemplary concentrated disinfectant/sanitizer solution according to any one of the first through sixth exemplary concentrated disinfectant/sanitizer solutions or any of the following concentrated disinfectant/sanitizer solutions, wherein the disinfectant/sanitizer solution is non-aqueous and the Main Solvent is selected from ethers, alcohols, glycols, glycol ethers, glycol ether acetates, glycol diethers, polyols, hydrogels and combinations thereof.

A ninth exemplary concentrated disinfectant/sanitizer solution according to any one of the first through eighth exemplary concentrated disinfectant/sanitizer solutions or any of the following concentrated disinfectant/sanitizer solutions, further comprising a corrosion inhibitor.

A tenth exemplary concentrated disinfectant/sanitizer solution according to any one of the first through ninth exemplary concentrated disinfectant/sanitizer solutions or any of the following concentrated disinfectant/sanitizer solutions, further comprising one or more stability enhancers selected from: radical scavenger (including anti-oxidants), pH adjuster and combinations thereof.

An eleventh exemplary concentrated disinfectant/sanitizer solution according to any one of the first through tenth exemplary concentrated disinfectant/sanitizer solutions or any of the following concentrated disinfectant/sanitizer solutions, further comprising a chelant.

A twelfth exemplary concentrated disinfectant/sanitizer solution according to any one of the first through eleventh exemplary concentrated disinfectant/sanitizer solutions or any of the following concentrated disinfectant/sanitizer solutions, wherein the concentrated disinfectant/sanitizer solution is clear.

A thirteenth exemplary concentrated disinfectant/sanitizer solution according to any one of the first through twelfth exemplary concentrated disinfectant/sanitizer solutions or any of the following concentrated disinfectant/sanitizer solutions, wherein the concentrated disinfectant/sanitizer solution is substantially free of aldehyde selected from: glutaraldehyde, formaldehyde and combinations thereof.

A fourteenth exemplary concentrated disinfectant/sanitizer solution according to any one of the first through thirteenth exemplary concentrated disinfectant/sanitizer solutions or any of the following concentrated disinfectant/sanitizer solutions, wherein the concentrated disinfectant/sanitizer solution is substantially free of anionic surfactant.

A fifteenth exemplary concentrated disinfectant/sanitizer solution according to any one of the first through fourteenth exemplary concentrated disinfectant/sanitizer solutions or any of the following concentrated disinfectant/sanitizer solutions, wherein the concentrated disinfectant/sanitizer solution is substantially free of polybiguanide.

A sixteenth exemplary concentrated disinfectant/sanitizer solution according to any one of the first through fifteenth exemplary concentrated disinfectant/sanitizer, wherein the disinfectant/sanitizer solution is formulated as a foam, spray (a non-limiting example of a spray is an aerosolized disinfectant/sanitizer solution), dip, soak or fog.

A first exemplary disinfectant/sanitizer wipe comprising a nonwoven substrate saturated with any one of the first through fifteenth exemplary concentrated disinfectant/sanitizer solutions.

A ready to use disinfectant/sanitizer solution comprising by weight percentage of the concentrated disinfectant/sanitizer solution:

(a) from about 0.02% to about 2%, from about 0.005% to about 1%, from about 0.01% to about 0.5% or from about 0.02% to about 0.3%, of a quaternary ammonium compound having the following general formula (I):

$$R_1R_2R_3R_4N+X-$$

wherein, $R_1$, $R_2$, $R_3$ and $R_4$ represent independently of each other, alkyl groups, aliphatic groups, aromatic groups, alkoxy groups, polyoxyalkylene groups, alkylamido groups, hydroxyalkyl groups, aryl groups, and $H^+$ ions, each with from 1 to 22 carbon atoms, with the proviso that at least one of the groups $R_1$, $R_2$, $R_3$ and $R_4$ has at least eight carbon atoms and wherein X− represents an anion;

(b) from about 0.001% to about 2%, from about 0.002% to about 1% or from about 0.005% to about 0.5% of an aldehyde;

(c) from about 0.001% to about 10%, from about 0.002% to about 5% or from about 0.005% to about 1% of a surfactant selected from: nonionic surfactant, cationic surfactant and combinations thereof;

(d) from about 40% to about to about 99.999%, from about 50% to about 99.95%, or from about to about 75% to about 99.8% of a Main Solvent; and (e) from about 0.001% to about 40%, from about 0.002% to about 30% or from about 0.005% to about 10% of a Co-Solvent.

A second exemplary ready to use disinfectant/sanitizer solution according to the first exemplary ready to use disinfectant/sanitizer solution or any of the following ready to use disinfectant/sanitizer solutions, wherein the quaternary ammonium compound is selected from: mono alkyl trimethyl ammonium compounds, mono alkyl dimethyl benzyl ammonium salts, dialkyl dimethyl ammonium salts, heteroaromatic ammonium salts, polysubstituted quaternary ammonium salts, bisquaternary ammonium salts, polymeric ammonium salts and combinations thereof.

A third exemplary ready to use disinfectant/sanitizer solution according to either one of the first and second exemplary ready to use disinfectant/sanitizer solutions or any of the following concentrated disinfectant/sanitizer solutions, wherein the aldehyde is GRAS certified and either has antimicrobial activity or forms a precursor of a compound having antimicrobial activity.

A fourth exemplary ready to use disinfectant/sanitizer solution according to either one of the first through third exemplary ready to use disinfectant/sanitizer solutions or any of the following ready to use disinfectant/sanitizer solutions, wherein the aldehyde is selected from: cinnamaldehyde, 3,4-dihydroxycinnamic acid, benzaldehyde, geranial, citral (i.e., neral), citronellal, acetaldehyde; ethyl vanillin; piperonal; vanillin; decanal (i.e., N-decylaldehyde, capraldehyde, capric aldehyde, caprinaldehyde, or aldehyde C-10); and combinations thereof.

A fifth exemplary ready to use disinfectant/sanitizer solution according to any one of the first through fourth exemplary ready to use disinfectant/sanitizer solutions or any of the following ready to use disinfectant/sanitizer solutions, wherein the surfactant is selected from: cationic surfactant, nonionic surfactant and combinations thereof.

A sixth exemplary ready to use disinfectant/sanitizer solution according to any one of the first through fifth exemplary ready to use disinfectant/sanitizer solutions or any of the following ready to use disinfectant/sanitizer solutions, wherein the surfactant is an EO/PO copolymer surfactant having an HLB value of from about 8 to about 60, from about 10 to about 20, or from about 12 to about 15.

A seventh exemplary ready to use disinfectant/sanitizer solution according to any one of the first through sixth exemplary ready to use disinfectant/sanitizer solutions or any of the following ready to use disinfectant/sanitizer solutions from the ninth and further exemplary concentrated disinfectant/sanitizer solutions below, wherein the disinfectant/sanitizer solution is an aqueous and comprises one or more Co-Solvents selected from ethers; alcohols; glycols; glycol ethers, glycol ether acetates, glycol diethers; polyols; hydrogels; and combinations thereof.

An eighth exemplary ready to use disinfectant/sanitizer solution according to any one of the first through sixth exemplary ready to use disinfectant/sanitizer solutions or any of the following ready to use disinfectant/sanitizer solutions, wherein the disinfectant/sanitizer solution is non-aqueous and the Main Solvent is selected from ethers, alcohols, glycols, glycol ethers, glycol ether acetates, glycol diethers, polyols, hydrogels and combinations thereof.

A ninth exemplary ready to use disinfectant/sanitizer solution according to any one of the first through eighth exemplary ready to use disinfectant/sanitizer solutions or any of the following ready to use disinfectant/sanitizer solutions, further comprising a corrosion inhibitor.

A tenth exemplary ready to use disinfectant/sanitizer solution according to any one of the first through ninth exemplary ready to use disinfectant/sanitizer solutions or any of the following ready to use disinfectant/sanitizer solutions, further comprising one or more stability enhancers selected from: radical scavenger (including anti-oxidants), pH adjuster and combinations thereof.

An eleventh exemplary ready to use disinfectant/sanitizer solution according to any one of the first through tenth exemplary ready to use disinfectant/sanitizer solutions or any of the following ready to use disinfectant/sanitizer solutions, further comprising a chelant.

A twelfth exemplary ready to use disinfectant/sanitizer solution according to any one of the first through eleventh exemplary ready to use disinfectant/sanitizer solutions or any of the following ready to use disinfectant/sanitizer solutions, wherein the concentrated disinfectant/sanitizer solution is clear.

A thirteenth exemplary ready to use disinfectant/sanitizer solution according to any one of the first through twelfth exemplary ready to use disinfectant/sanitizer solutions or any of the following ready to use disinfectant/sanitizer solutions, wherein the concentrated disinfectant/sanitizer solution is substantially free of aldehyde selected from: glutaraldehyde, formaldehyde and combinations thereof.

A fourteenth exemplary ready to use disinfectant/sanitizer solution according to any one of the first through thirteenth exemplary ready to use disinfectant/sanitizer solutions or any of the following ready to use disinfectant/sanitizer solutions, wherein the concentrated disinfectant/sanitizer solution is substantially free of anionic surfactant.

A fifteenth exemplary ready to use disinfectant/sanitizer solution according to any one of the first through fourteenth exemplary ready to use disinfectant/sanitizer solutions or any of the following ready to use disinfectant/sanitizer solutions, wherein the concentrated disinfectant/sanitizer solution is substantially free of polybiguanide.

A sixteenth exemplary ready to use disinfectant/sanitizer solution according to any one of the first through fifteenth exemplary ready to use disinfectant/sanitizer solutions or any of the following ready to use disinfectant/sanitizer solutions, wherein the disinfectant/sanitizer solution is formulated as a foam, spray (including, but not limited to, formulated as an aerosol spray), dip, soak or fog.

A second exemplary disinfectant/sanitizer wipe comprising a nonwoven substrate saturated with any one of the first through fifteenth exemplary ready to use disinfectant/sanitizer solutions.

A first method of disinfecting and/or sanitizing a hard surface comprising:

(a) applying a disinfectant/sanitizer solution according to any one of the first through sixteenth concentrated disinfecting and/or sanitizing solutions or any one of the first through sixteenth ready to use disinfecting and/or sanitizing solutions to a hard surface; and (b) allowing the solution to remain on the hard surface for a period of time.

A second method of disinfecting and/or sanitizing a hard surface according to any one of the first method or third through tenth methods of disinfecting and/or sanitizing a hard surface, further comprising rinsing the hard surface with water.

A third method of disinfecting and/or sanitizing a hard surface according to the first method, wherein the disinfectant/sanitizer solution is a concentrated disinfectant/sanitizer solution, the method further comprising diluting the concentrated disinfectant/sanitizer solution prior to applying it to the hard surface.

A fourth method of disinfecting and/or sanitizing a hard surface according to either one of the first method and the second method, wherein the disinfectant/sanitizer solution is a concentrated disinfectant/sanitizer solution, the method further comprising diluting the concentrated disinfectant/sanitizer solution with water prior to use at a ratio of 1:128 concentrated disinfectant/sanitizer solution to water.

A fifth method of disinfecting and/or sanitizing a hard surface according to any one of the first method through fourth methods, wherein the solution is allowed to remain on the hard surface for greater than 0 minutes and less than or equal to 10 minutes and the hard surface is disinfected.

A sixth method of disinfecting and/or sanitizing a hard surface according to any one of the first method through fourth methods, wherein the solution is allowed to remain on the hard surface for greater than 0 minutes and less than or equal to 5 minutes and the hard surface is sanitized.

A seventh method of disinfecting and/or sanitizing a hard surface using either one of the first or second exemplary disinfectant/sanitizer wipes, the method comprising:
  (a) applying the wipe to a hard surface to be treated;
  (b) wiping the wipe across the hard surface;
  (c) expressing disinfectants/sanitizer solution from the wipe onto the hard surface; and
  (d) allowing the disinfectant/sanitizer solution to remain on the surface for a period of time.

An eighth method of disinfecting a hard surface according to the seventh method, wherein the solution is allowed to remain on the hard surface for more than 0 minutes and less than or equal to 10 minutes and the hard surface is disinfected.

A ninth method sanitizing a hard surface according to the seventh method, wherein the solution is allowed to remain on the hard surface for more than 0 seconds and less than or equal to 5 minutes and the hard surface is sanitized.

A tenth method of disinfecting and/or sanitizing a hard surface according to any one of the seventh through ninth methods, the method further comprising drying the hard surface by wiping the hard surface with a dry wipe or wiping device, particularly one that has not previously been used.

A first method of making an exemplary disinfectant/sanitizer solutions according to any one of the foregoing exemplary concentrated and ready to use disinfectant/sanitizer solutions, the method comprising:
  (a) adding to a mixing vessel in the following order, the Main Solvent, the Co-Solvent, the aldehyde and the surfactant; and stirring them together;
  (b) adding the QAC the mixing vessel; and
  (c) stirring until a clear solution is generated in the mixing vessel.

A second method of making a disinfectant/sanitizer solution, the method comprising:
  (a) adding to a mixing vessel in the following order: a Main Solvent, a Co-Solvent, an aldehyde and a surfactant, and stirring them together;
  (b) adding a quaternary ammonium compound to the mixing vessel, the quaternary ammonium compound having the following general formula (I):

$$R_1R_2R_3R_4N+X-$$

wherein, $R_1$, $R_2$, $R_3$ and $R_4$ represent independently of each other, alkyl groups, aliphatic groups, aromatic groups, alkoxy groups, polyoxyalkylene groups, alkylamido groups, hydroxyalkyl groups, aryl groups, and $H^+$ ions, each with from 1 to 22 carbon atoms, with the proviso that at least one of the groups $R_1$, $R_2$, $R_3$ and $R_4$ has at least eight carbon atoms and wherein X– represents an anion; and
  (c) stirring until a clear disinfectant/sanitizer solution is generated in the mixing vessel.

A third method of making a disinfectant/sanitizer solution according to the second method of making a disinfectant/sanitizer solution, wherein the aldehyde is cinnamaldehyde and the disinfectant/sanitizer solution is substantially free of anionic surfactant, glutaraldehyde and polybiguanide.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above, are illustrative and are not required. Accordingly, the scope of the present invention should be considered in terms of any claims that may be presented and is understood not to be limited to the details of structure and operation shown and described in the specification and drawings.

I claim:

1. A concentrated micellar disinfectant/sanitizer solution consisting of, by weight percentage of the concentrated disinfectant/sanitizer solution:
  (a) from about 1% to about 50%, by weight, of a quaternary ammonium compound having the following general formula (I):

$$R_1R_2R_3R_4N+X-$$

wherein, $R_1$, $R_2$, $R_3$ and $R_4$ represent independently of each other, alkyl groups, aliphatic groups, aromatic groups, alkoxy groups, polyoxyalkylene groups, alkylamido groups, hydroxyalkyl groups, aryl groups, and $H^+$ ions, each with from 1 to 22 carbon atoms, with the proviso that at least one of the groups $R_1$, $R_2$, $R_3$ and $R_4$ has at least eight carbon atoms and wherein $X^-$ represents an anion;
  (b) from about 0.1% to about 20%, by weight, of cinnamaldehyde;
  (c) from about 0.1% to about 30%, by weight, of a surfactant selected from: nonionic surfactant, cationic surfactant and combinations thereof;
  (d) from about 50% to about 75%, by weight, of a main solvent, wherein the main solvent is water;
  (e) from about 0.5% to about 40%, by weight, of a co-Solvent selected from: ethers, alcohols, glycols, glycol ethers, glycol ether acetates, glycol diethers, polyols, hydrogels, and combinations thereof; and optionally, (f) one or more stability enhancers selected rom: radical scavenger, pH adjuster and combinations thereof; and wherein the concentrated disinfectant/sanitizer solution is clear.

2. A ready-to-use disinfectant solution comprising one ounce of the concentrated disinfectant/sanitizer solution of claim 1 that has been diluted with 128 ounces of water.

3. A ready-to-use sanitizer solution comprising one ounce of the concentrated disinfectant/sanitizer solution of claim 1 that has been diluted with 256 ounces of water.

4. The concentrated disinfectant/sanitizer solution of claim 1, said surfactant comprising an HLB value of from about 8 to about 60.

5. The concentrated disinfectant/sanitizer solution of claim 1, said co-solvent being selected from 2 (2-butoxy-ethoxy) ethanol, polyethylene glycol, propylene glycol, 2-propanol, glycerine, or combinations thereof.

* * * * *